(12) United States Patent
Ryu et al.

(10) Patent No.: US 10,096,055 B2
(45) Date of Patent: Oct. 9, 2018

(54) SYSTEM AND METHOD OF PROVIDING OBJECT FOR SERVICE OF SERVICE PROVIDER

(71) Applicant: SAMSUNG ELECTRONICS CO., LTD., Suwon-si (KR)

(72) Inventors: Jong-hyun Ryu, Daejeon (KR); Nam-wook Kang, Seoul (KR); Jae-young Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 847 days.

(21) Appl. No.: 14/174,305

(22) Filed: Feb. 6, 2014

(65) Prior Publication Data
US 2014/0222613 A1    Aug. 7, 2014

(30) Foreign Application Priority Data

Feb. 6, 2013   (KR) ........................ 10-2013-0013490
Jul. 19, 2013   (KR) ........................ 10-2013-0085682

(51) Int. Cl.
*G06Q 30/06*      (2012.01)
*G06Q 20/14*      (2012.01)
(Continued)

(52) U.S. Cl.
CPC ....... *G06Q 30/0631* (2013.01); *G06Q 20/145* (2013.01); *G06Q 30/06* (2013.01)

(58) Field of Classification Search
CPC ........... G06Q 30/0201; G06Q 30/0243; G06Q 30/0251; G06Q 30/0255; G06Q 30/0244;
(Continued)

(56) References Cited

U.S. PATENT DOCUMENTS 7,100,195 B1 *   8/2006   Underwood ............ G06F 9/451
                                                                      726/2
8,341,550 B2   12/2012   De Heer
(Continued)

FOREIGN PATENT DOCUMENTS

JP      2003-67627 A    3/2003
JP      2009-230334 A   10/2009
(Continued)

OTHER PUBLICATIONS

Communication dated Apr. 9, 2014 issued by the European Patent Office in counterpart European Patent Application No. 14154196.1.
(Continued)

*Primary Examiner* — Florian M Zeender
*Assistant Examiner* — Dana Amsdell
(74) *Attorney, Agent, or Firm* — Sughrue Mion, PLLC

(57) ABSTRACT

A server and method of providing an object for accessing a service of a service provider are provided. The server includes a context model providing unit configured to provide to the service provider at least one context model that is associated with the service, which is used by a device or a user, and a situation in which the device or the user uses the service; a purchase request receiving unit configured to receive a purchase request submitted by the service provider for a context model which is selected from among the at least one context model; and an object generation unit configured to generate the object for accessing the service of the service provider. The generated object is matched with the context model associated with the purchase request received from the service provider.

25 Claims, 19 Drawing Sheets

(51) Int. Cl.
  *H04N 21/43* (2011.01)
  *H04N 21/25* (2011.01)
(58) Field of Classification Search
  CPC ............ G06Q 30/0261; G06Q 30/0269; H04L
    29/0809; H04L 41/5083; H04L 67/1014;
    H04N 21/2543; H04N 21/4622; H04N
    21/84; H04N 21/23617; H04N 21/25883;
    H04N 21/262; H04N 21/26266; H04N
    21/431; H04N 21/47205; H04N 21/4668
  See application file for complete search history.

(56) References Cited

U.S. PATENT DOCUMENTS

| | | | | |
|---|---|---|---|---|
| 8,671,021 | B2 * | 3/2014 | Maharajh | G06F 17/30035 |
| | | | | 705/14.66 |
| 8,850,482 | B2 * | 9/2014 | McCarthy | G06F 17/30893 |
| | | | | 725/45 |
| 9,003,438 | B2 * | 4/2015 | Gordon | H04N 21/2665 |
| | | | | 705/14.49 |
| 2002/0156646 | A1 | 10/2002 | Kaiwa et al. | |
| 2003/0135582 | A1 | 7/2003 | Allen et al. | |
| 2006/0265427 | A1 * | 11/2006 | Cohen | G06F 17/30038 |
| 2007/0005766 | A1 | 1/2007 | Singhal et al. | |
| 2008/0194233 | A1 | 8/2008 | Henry | |
| 2008/0201225 | A1 * | 8/2008 | Maharajh | G06F 17/30035 |
| | | | | 705/14.43 |
| 2008/0281702 | A1 | 11/2008 | Kirkwood | |
| 2009/0106087 | A1 | 4/2009 | Konar | |
| 2009/0216682 | A1 * | 8/2009 | Foladare | G06Q 30/02 |
| | | | | 705/80 |
| 2009/0240586 | A1 * | 9/2009 | Ramer | G06F 17/30905 |
| | | | | 705/14.64 |
| 2010/0069035 | A1 * | 3/2010 | Johnson | H04W 4/02 |
| | | | | 455/404.1 |
| 2010/0082431 | A1 * | 4/2010 | Ramer | G06Q 30/02 |
| | | | | 705/14.52 |
| 2010/0107203 | A1 * | 4/2010 | McCarthy | G06F 17/30893 |
| | | | | 725/109 |
| 2010/0153487 | A1 * | 6/2010 | Greven | G06Q 10/06311 |
| | | | | 709/203 |
| 2011/0022476 | A1 | 1/2011 | Barkley et al. | |
| 2011/0153421 | A1 | 6/2011 | Novikov et al. | |
| 2011/0178831 | A1 * | 7/2011 | Ravichandran | G06Q 10/06 |
| | | | | 705/7.11 |
| 2011/0179145 | A1 * | 7/2011 | Ravichandran | G06Q 10/06 |
| | | | | 709/219 |
| 2011/0191165 | A1 * | 8/2011 | Kiseli | G06Q 30/0246 |
| | | | | 705/14.45 |
| 2011/0238494 | A1 | 9/2011 | Park | |
| 2011/0289419 | A1 * | 11/2011 | Yu | G06F 9/44526 |
| | | | | 715/738 |
| 2012/0072276 | A1 | 3/2012 | Stivers | |
| 2012/0101903 | A1 | 4/2012 | Oh et al. | |
| 2012/0302270 | A1 | 11/2012 | Sathish | |
| 2013/0110992 | A1 * | 5/2013 | Ravindra | H04W 4/185 |
| | | | | 709/220 |
| 2013/0305278 | A1 * | 11/2013 | Gordon | H04N 21/2665 |
| | | | | 725/32 |
| 2013/0339498 | A1 * | 12/2013 | Johnson | H04W 4/02 |
| | | | | 709/221 |

FOREIGN PATENT DOCUMENTS

| | | |
|---|---|---|
| JP | 2010-257402 A | 11/2010 |
| JP | 2011-508471 A | 3/2011 |
| JP | 2011-257893 A | 12/2011 |
| JP | 2012-511205 A | 5/2012 |
| JP | 2012-517648 A | 8/2012 |
| WO | 2011/141238 A1 | 11/2011 |
| WO | 2011/159469 A2 | 12/2011 |

OTHER PUBLICATIONS

International Search Report dated May 21, 2014 issued in International Application No. PCT/KR2014/000959 (PCT/ISA/210).
Written Opinion dated May 21, 2014 issued in International Application No. PCT/KR2014/000959 (PCT/ISA/220/237).
Communication dated Mar. 5, 2018, issued by the Japanese Patent Office in counterpart Japanese Patent Application No. No. 2014-021042.

* cited by examiner

FIG. 8

| SERVICE PROVIDER | MORNING DRAMA | COMEDY SHOW | ENGLISH LECTURE | BASEBALL BROADCAST |
|---|---|---|---|---|
| AA | ○ | ○ | | ○ |
| BB | ○ | ○ | ○ | |
| CC | ○ | | | |
| DD | | ○ | | ○ |
| EE | | | ○ | |
| CHARGING METHOD | AUCTION METHOD | GROUP PURCHASING METHOD | CHARGING METHOD DEPENDING ON OBJECT EXPOSURE | CHARGING METHOD DEPENDING ON SERVICE USAGE FEE |

FIG. 9

| SERVICE PROVIDER | SERVICE OF SERVICE PROVIDER | WEEKDAY MORNINGS | HOUSEWIFE | TV |
|---|---|---|---|---|
| AA | MORNING DRAMA A | ○ | ○ | ○ |
| BB | MORNING DRAMA B | ○ | | ○ |
| CC | MORNING DRAMA C | ○ | ○ | |

FIG. 12

| SERVICE PROVIDER | SERVICE TYPE | CONTEXT ITEM | PURCHASING FEE | OBJECT EXPOSURE PROBABILITY |
|---|---|---|---|---|
| AA | MORNING DRAMA | WEEKDAY MORNINGS, HOUSEWIFE, TV | 30 MILLION WON | 75% |
| BB | MORNING DRAMA | WEEKDAY MORNINGS, HOUSEWIFE, TV | 10 MILLION WON | 25% |

FIG. 21

| Classification | Classification | Value |
|---|---|---|
| Streaming Information | GPS | Latitude, Longitude |
| | Accelerometer | x, y, z Acceleration Values |
| | Proximity | Existence/Absence of Object Proximate to Phone |
| | Illuminometer | Degree of Brightness of Ambient Illumination |
| | Magnetic | Intensity of Magnetism and Azimuth of Magnetism |
| | Orientation | x, y, z Acceleration of Gravity |
| | Battery | Battery Remains |
| | WiFi | AP, WiFi IP, Intensity of Signal |
| | Bluetooth | Bluetooth ID, Intensity of Signal |
| | MIC. | Intensity of Sound |
| Event Information | Phone Profile | Bell Sound Mode, Vibration Mode, Silent Mode, Airplane Mode |
| | Calendar | Registered Schedule |
| | E-Mail | Received/Transmitted E-Mail |
| | SMS | Received/Transmitted Message |
| | Call | Received/Transmitted Call |
| | Alarm | Registered Alarm |
| | Application | Usable Application Program and Function |
| Web Service Information | Broadcast Service | Watched Broadcast Program |
| | Music Service | Downloaded Music |
| | Weather Service | Weather Information |
| | Traffic Service | Traffic Information |
| | Picture Sharing Service | Shared Picture |

SYSTEM AND METHOD OF PROVIDING OBJECT FOR SERVICE OF SERVICE PROVIDER

RELATED APPLICATIONS

This application claims priority from Korean Patent Application No. 10-2013-0013490, filed on Feb. 6, 2013, and Korean Patent Application No. 10-2013-0085682, filed on Jul. 19, 2013, in the Korean Intellectual Property Office, the disclosures of which are incorporated herein in their entirety by reference.

BACKGROUND

1. Field

Methods and apparatuses consistent with exemplary embodiments relate to providing an object for a service of a service provider to a device.

2. Description of the Related Art

With improvements in the performance of devices and network technology, users can receive various services from various service providers using their own devices. However, as service providers and the types of services that the service providers provide become more diverse, it is difficult for users to find services suitable to their situations. It is also difficult for service providers to effectively collect information about target users who need to use services.

Thus, there is demand for an object service providing technology for effectively suggesting the services of service providers to users so that the users may use desired services. Moreover, an object service providing technology capable of effectively inducing participation by service providers by effectively calculating a charging fee related to providing the services of the service providers to users is needed.

SUMMARY

One or more exemplary embodiments may include an object providing system and method in which a service provider may provide a device with an object for accessing a service of the service provider, based on a context item purchased by the service provider.

One or more exemplary embodiments may include an object providing system and method by which a fee that is to be charged to a service provider may be determined as an object for accessing a service of the service provider is provided to the device.

One or more exemplary embodiments may include an object providing system and method in which context information collected from a device may be modeled as a context model and a purchase request for a context item may be received from a service provider based on the context model.

One or more exemplary embodiments may include an object providing system and method by which a charging fee for a service provider may be determined according to a charging method determined by a service provider.

Additional aspects will be set forth in part in the description which follows and, in part, will be apparent from the description, or may be learned by practice of the presented embodiments.

According to an aspect of an exemplary embodiment, there is provided a server for providing an object for accessing a service of a service provider, the server including a context model providing unit configured to provide to the service provider at least one context model that is associated with the service, which is used by a device or a user, and a situation in which the device or the user uses the service; a purchase request receiving unit configured to receive a purchase request submitted by the service provider for a context model which is selected from among the at least one context model; and an object generation unit configured to generate the object for accessing the service of the service provider, wherein the generated object is matched with the context model associated with the purchase request received from the service provider.

The server may further include an object providing unit configured to select the context model from among the at least one context model according to a current situation of the device and provide the device with the object which is used to use the service of the service provider that requested to purchase the selected context model.

The object providing unit may be configured to monitor the current situation of the device and select the context model based on a result of the monitoring.

The context model providing unit may be configured to generate and provide the at least one context model to the service provider.

The at least one context model may include a plurality of context items and a plurality of service types matched with the plurality of context items, and the purchase request may be a purchase request submitted by the service provider for at least one context item selected from among the plurality of context items.

The plurality of context items may be suggested to the service provider according to the plurality of service types.

The purchase request receiving unit may be configured to match the at least one context item associated with the purchase request with the service of the service provider.

The server may further include a charging fee determination unit which is configured to determine a charging fee which the service provider pays when the object is provided to the service provider.

The server may further include a charging method determination unit which is configured to receive information about a charging method selected by the service provider and determine a charging method for the service provider based on the received information about the charging method, wherein the charging fee determination unit is configured to calculate the charging fee based on the determined charging method.

The charging method may include a group purchasing method, the charging method determination unit may be configured to determine an exposure probability of the object for accessing the service of the service provider, based on a purchase fee paid by the service provider, and the object providing unit may be configured to provide the object to the device based on the exposure probability.

The charging method may include an auction method, and the object providing unit may be configured to provide to the device the object for accessing the service of the service provider, when a bid amount of the service provider is higher than a bid amount of another service provider.

The charging method is a method of charging the service provider according to the degree of exposure of the object, and the charging fee determination unit may be configured to calculate the charging fee based on at least one of a number of times the object is provided and a number of times the object is executed by the device.

The charging method is a method of charging the service provider according to use of the service via the object, and the charging fee determination unit may be configured to calculate the charging fee based on at least one of a purchase fee of content purchased by the device via the service that is used via the object and a utilization fee of the service used via the object.

The object generation unit may be configured to provide a template for use in generation of the object to the service provider, receive an edited template from the service provider, and generate the object using the edited template.

The object generation unit may be configured to insert a reason why the object is recommended, into the edited template.

The edited template may be obtained by the service provider using an editing tool which the service provider receives from the server.

The object may include a user interface including icons, texts, images, and link information of content provided via the service, and a description about functions of the object.

According to an aspect of another exemplary embodiment, there is provided a method in which a server provides an object for accessing a service of a service provider, the method including: providing to the service provider at least one context model that is associated with the service, which is used by a device or a user, and a situation in which the device or the user uses the service; receiving a purchase request submitted by the service provider for a context model which is selected from among the at least one context model; and generating the object for accessing the service of the service provider, in response to receiving the purchase request, wherein the generated object is matched with the context model associated with the purchase request received from the service provider.

The method may further include: selecting the context model from among the at least one context model according to a current situation of the device; and providing the device with the object for accessing the service of the service provider that requested to purchase the selected context model.

The providing of the object may include monitoring the current situation of the device and selecting the context model based on a result of the monitoring.

According to an aspect of another exemplary embodiment, there is provided a method in which a service provider transmits a purchase request for a context model to a server, the method including: receiving from the server at least one context model that is associated with a situation in which a service is used by a device or a user and the service used by the device or the user in the situation, and selecting a context model from among the at least one context model; and transmitting a purchase request for the selected context model to the server, wherein an object for accessing a service of the service provider is generated by the server in response to the purchase request, and the generated object is matched with the context model associated with the purchase request transmitted by the service provider.

The received at least one context model may include a plurality of context items and a plurality of service types matched with the plurality of context items.

The selecting of the context model may include selecting at least one context item from among a plurality of context items included in the received at least one context model.

According to an aspect of another exemplary embodiment, there is provided a non-transitory computer-readable medium storing a program causing a computer to execute a method in which a server provides an object for accessing a service of a service provider, the method including: providing to the service provider at least one context model that is associated with the service, which is used by a device or a user, and a situation in which the device or the user uses the service; receiving a purchase request submitted by the service provider for a context model which is selected from among the at least one context model; and generating the object for accessing the service of the service provider, in response to receiving the purchase request, wherein the generated object is matched with the context model associated with the purchase request received from the service provider.

According to an aspect of another exemplary embodiment, there is provided non-transitory computer-readable medium storing a program causing a computer to execute a method in which a service provider transmits a purchase request for a context model to a server, the method including: receiving from the server at least one context model that is associated with a situation in which a service is used by a device or a user and the service used by the device or the user in the situation, and selecting a context model from among the at least one context model; and transmitting a purchase request for the selected context model to the server, wherein an object for accessing a service of the service provider is generated by the server in response to the purchase request, and the generated object is matched with the context model associated with the purchase request transmitted by the service provider

BRIEF DESCRIPTION OF THE DRAWINGS

The above and/or other aspects will become apparent and more readily appreciated from the following description of exemplary embodiments, taken in conjunction with the accompanying drawings in which:

FIG. 8 is a table showing an example in which the service provider determines the types of services associated with context models and determines charging methods for the determined services;

FIG. 9 is a table showing an example in which the service provider purchases a context model;

FIG. 12 is a table showing an example in which an exposure probability of an object is determined via a group purchasing method;

FIG. 21 is a table showing a part of context information which is collected from a device and a cloud server.

DETAILED DESCRIPTION

Figure 1:
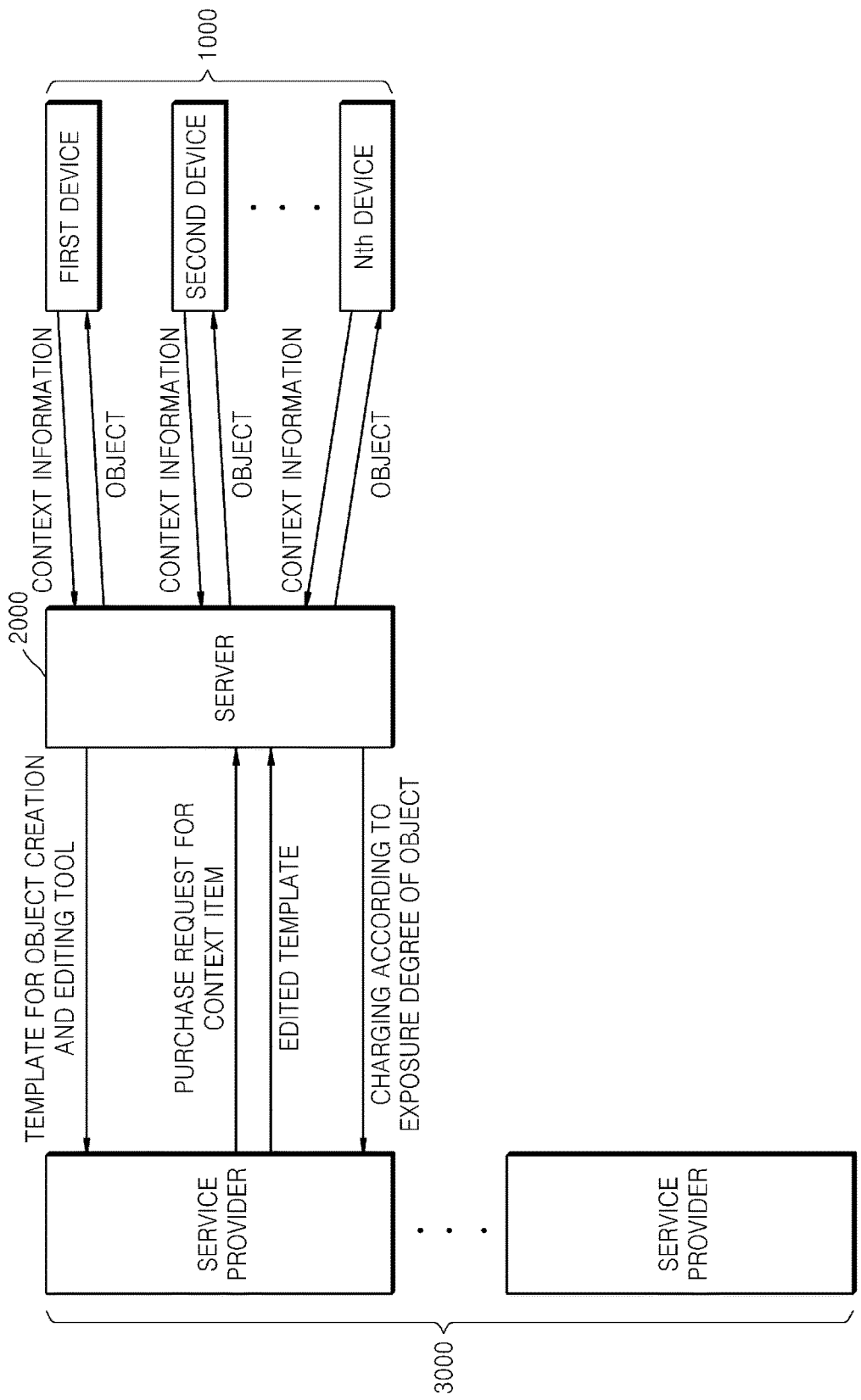
FIG. 1 is a conceptual diagram illustrating a system for providing objects used to access a service, according to an exemplary embodiment.

Reference will now be made in detail to exemplary embodiments, examples of which are illustrated in the accompanying drawings, wherein like reference numerals refer to the like elements throughout. In this regard, exemplary embodiments may have different forms and should not be construed as being limited to the descriptions set forth herein. Accordingly, exemplary embodiments are merely described below, by referring to the figures, to explain aspects of the present description. Expressions such as "at least one of," when preceding a list of elements, modify the entire list of elements and do not modify the individual elements of the list.

Throughout the specification, when an element is referred to as being "connected" or "coupled" to another element, it can be directly connected or coupled to the other element, or can be electrically connected or coupled to the other element with intervening elements interposed therebetween. In addition, the terms "comprises" and/or "comprising" or "includes" and/or "including" when used in this specification, specify the presence of stated elements, but do not preclude the presence or addition of one or more other elements.

In the present specification, the term 'object for accessing a service' denotes a user interface used to access a service of a service provider. The object for accessing a service may be a user interface that is used to use a service provided from a server or a content provider. The object for accessing a service may be a user interface including, for example, icons, text, images, and link information, and a description about the functions of the object.

Also, a device may receive an object from the server, and may use a service provided by the service provider using the object based on a user input to the object. The device may acquire contents from an application program in the device, a data source, a server, and a content provider and may process the acquired contents, using the object. The object may also be a user interface in which predetermined services provided based on context information of a user (or device) are packaged.

Instead of being separately installed in or executed by the device, the object may be analyzed by a host program of the device to be displayed on a screen of the device and to be used by the user. For example, the object may be a gadget; however, exemplary embodiments are not limited thereto. Instead of being separately installed in or executed by the device, the object may be displayed as a separate window on a screen of the device by a host program of the device.

In the present specification, the term 'context information' denotes information about a service which a device uses and a situation in which the device executes the service. The context information may include all kinds of information about situations related to the user (or device) and a computing circumstance. For example, the context information may include all kinds of information capable of characterizing the situations about an environment, object, and state of the user (or device). The device may use various types of services in various situations, and context information about a situation in which one of the various types of services is used by the device may be collected by a server.

In the present specification, the term 'context item' denotes details included in the context information. For example, the context item may be details about a user who has used a service, the type of a device that has used a service, service usage time, a location where a service is used, another user who also uses the service, and an application executed by a device; however, exemplary embodiments are not limited thereto.

The term 'context model' denotes a model in which at least one context item is matched with a predetermined service type. For example, a morning drama broadcasting service may be matched with at least one context item from among a user who used a service, the type of a device that used the service, service usage time, a location where the service is used, another user who also used the service, and an application executed by the device.

Purchasing a context model may include purchasing all of the context items included in the context model. Alternatively, purchasing a context model may include purchasing some of the context items included in the context model.

Selecting a context item may include selecting all of the context items included in a selected context model. Alternatively, selecting a context item may include selecting some of the context items included in a selected context model.

The service includes all kinds of services that a service provider provides to a device. Examples of the service may include broadcasting services, content sharing services, content providing services, power management services, game providing services, chatting services, document writing services, search services, calling services, photographing services, transportation recommendation services, and moving picture playback services. However, exemplary embodiments are not limited thereto.

FIG. 1 is a conceptual diagram illustrating a system for providing objects used to access a service, according to an exemplary embodiment.

Referring to FIG. 1, the system includes at least one device 1000, a server 2000, and at least one service provider 3000.

The device 1000 provides context information associated with service utilization of the device 1000, to the server 2000. For example, the context information may include context items, such as, the type of service, a user who used the service, the type of a device that used the service, service usage time, a location where the service is used, another user who also used the service, and an application executed by the device. The device 1000 receives an object for accessing a recommended service according to circumstances of the device 1000, from the server 2000. The device 1000 may use a service provided by the service provider 3000, using the object based on a user input to the object. The context information denotes information about a service which the device 1000 uses and a situation in which the device 1000 uses the service. The device 1000 may be a smart phone, a mobile phone, a personal digital assistant (PDA), a lap top, a media player, a global positioning system (GPS) device, and other mobile or non-mobile computing devices. The device 1000 may also be a device that is wearable by users. For example, the device 1000 may be a watch, glasses, a hair band, or a ring each having a communication function and a data processing function. However, exemplary embodiments are not limited thereto, and the device 1000 may be any kind of apparatus capable of receiving an object from the server 2000 via a network and executing the object.

The server 2000 may recommend predetermined context items according to the types of services based on the context information received from the device 100, and may sell the recommended context items to the service provider 3000. The server 2000 may provide an object for accessing a service provided by the service provider 3000, to the device 1000, and may calculate a fee which is to be charged to the service provider 3000 when the device 1000 uses the object to access the service provided by the service provider 3000.

The server 2000 receives the context information associated with the service utilization of the device 1000 from the device 1000 and models the context information. The server 2000 may recommend at least one context item for each service type. The server 2000 may generate context models by matching recommended context items with service types. For example, the server 2000 may recommend context items, such as, 'weekday mornings,' housewife; and 'TV,' for a morning drama broadcasting service.

In response to a purchase request from the service provider 300 to purchase a context model, the server 2000 may sell the requested context model to the service provider 3000. Purchasing a context model may include purchasing all or some of the context items included in the context model. The server 2000 may match a requested context item with a service provided by the service provider 3000. The server 2000 may also provide a template for object generation and an editing tool to the service provider 3000, receive a template edited by the service provider 3000 from the service provider 3000, and generate an object that is to be provided to the device 1000 using the template.

The server 2000 may provide an object associated with a service provided by the service provider 3000, to the device 1000, and may calculate a fee which is to be charged to the service provider 3000 when the device 1000 uses the object to access the service provided by the service provider 3000, according to a charging method. The charging method may be determined when the service provider 3000 purchases a context item, but exemplary embodiments are not limited thereto.

The service provider 3000 transmits a purchase request for the context model recommended by the server 2000 to the server 2000. The service provider 3000 may be a device or a server. The service provider 3000 may purchase all or some of the context items included in a context model recommended by the server 2000 and associated with a service that the service provider 3000 itself provides. When the service provider 3000 purchases a context item, the service provider 3000 may provide a service to the device 1000, if the device 1000 is in a situation the same as or similar a situation corresponding to the purchased context item. For example, the service provider 3000 may purchase context items, such as, 'weekday mornings,' 'housewife,' and 'TV,' for a morning drama A that the service provider 3000 itself provides. In this case, when a housewife uses the TV on weekday mornings, the morning drama A may be provided to the TV being watched by the housewife.

The service provider 3000 may receive a template that is used in the generation of an object via which a service provided by the service provider 3000 can be provided, from the server 2000. The service provider 3000 may edit the received template by inserting information about a service provided by the service provider 3000 into the received template. The service provider 3000 may provide the edited template to the server 2000.

Figure 2:
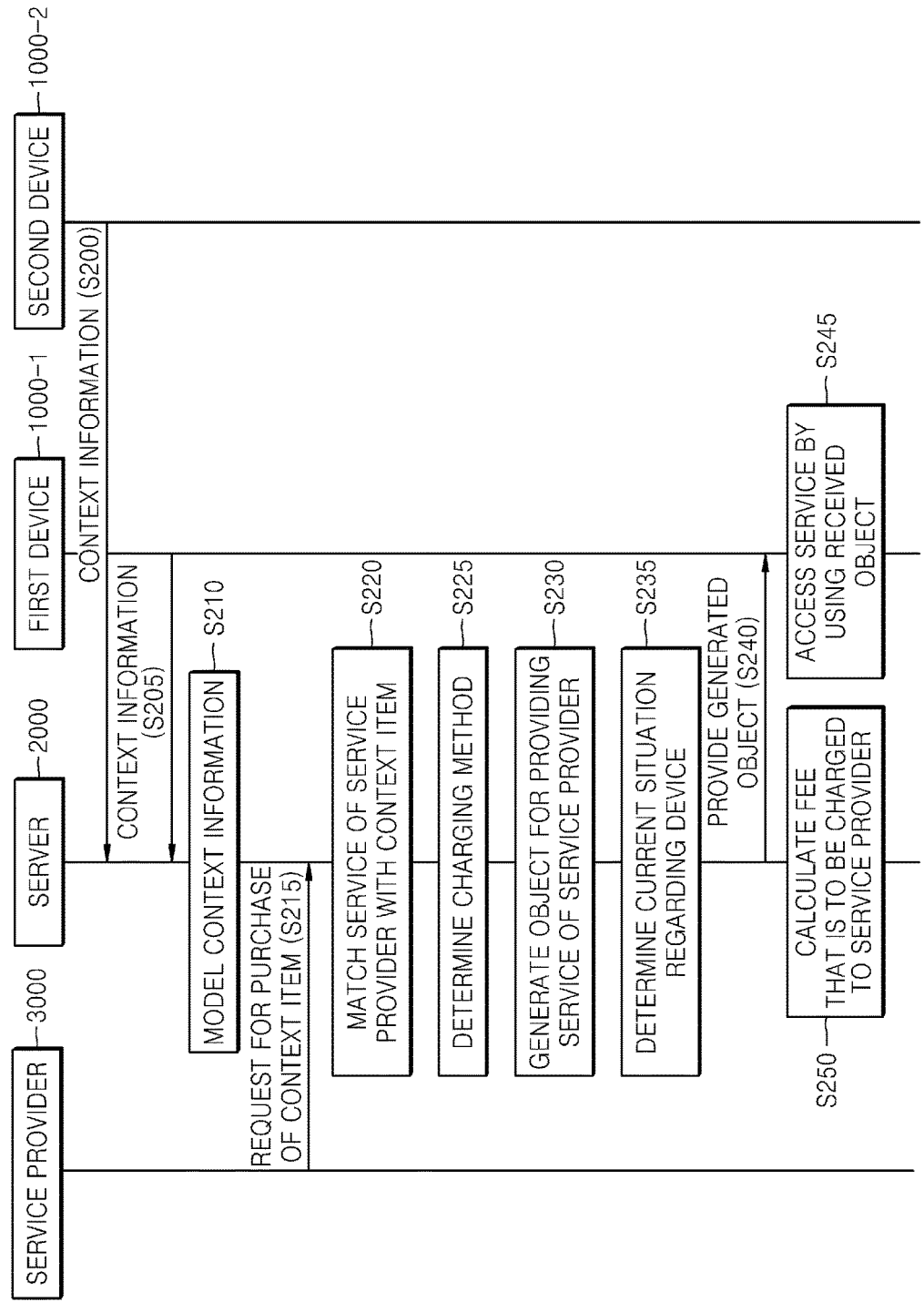
FIG. 2 is a flowchart illustrating a method in which the system of FIG. 1 provides a service to a device and determines a fee that is to be charged to a service provider.

FIG. 2 is a flowchart illustrating a method in which the system of FIG. 1 provides a service to the device 1000 and determines a fee that is to be charged to the service provider 3000 when the device 1000 uses the service.

In operation S200, the server 2000 receives context information from a second device 1000-2. In operation S205, the server 2000 receives context information from a first device 1000-1. The context information is information about a service which the device 1000 uses and a situation in which the device 1000 uses the service. The device 1000 may use various types of services in various situations, and context information about the situations in which the device 1000 utilizes the services may be collected by the server 2000. Context items are details included in the context information. For example, the context items may include a user who used a service, the type of a device that used the service, service usage time, a location where the service is used, another user who also used the service, and an application executed by the device; however, exemplary embodiments are not limited thereto.

The context information may include all kinds of information about situations related to the user (or device) and a computing circumstance. For example, the context information may include all kinds of information capable of characterizing the situations about an environment, object, and state of the user (or device). The context information may be abstracted by the server 2000 and may be classified into several types according to the degree of abstraction.

The context information may include sensor data collected from a sensor included in the device 1000, data about an application program operated in the device 1000 by a user input, and data associated with a cloud server that the device 1000 used.

As illustrated in FIG. 21, the collected data may include, for example, streaming information, event information, and web service (cloud computing) information.

The streaming information is information that is collected in real time. For example, the streaming information may include sensor data that is collected from the device 1000 in real time. The event information is information that is generated in accordance with generated events. For example, the event information may include data about changes to settings of the device 1000. The web service information is information about the utilization of a web service of the device 1000, and may include information about various contents that the device 1000 uses by accessing various web resources (for example, a cloud server). The web service information may include an enormous amount of information provided by web resources, and accordingly may be updated according to a cloud computing method.

In operation S210, the server 2000 models the context information to create a context model. The server 2000 may model the context information by selecting context items according to the types of services. For example, the server 2000 may select at least one of a user who used a service, the type of a device that used the service, service usage time, a location where the service is used, another user who also used the service, and an application executed by the device, for the service. For example, if a housewife frequently watches a morning drama via the TV on weekday mornings, the server 2000 may select context items, such as, 'weekday mornings,' 'housewife,' and 'TV,' for a morning drama broadcasting service.

The server 2000 may match the selected context items with the types of services. For example, the server 2000 may create a context model by matching the context items 'weekday mornings,' 'housewife,' and 'TV' with the morning drama broadcasting service. The context model may be used when the service provider 3000 determines a context item which is to be matched with a service provided by the service provider 3000.

In operation S210, the server 2000 may model the context information. The server may create a context model from the context information using a context engine (not shown). The server 2000 may create a context model by inferring the collected context information via various methods. For example, the server 2000 may create the context mode using at least one of an ontology-based method and a probability-based method.

The server 2000 may store the context information as dynamic information and static information. At least a portion of the context information may be abstracted according to a certain rule. The context information may include, for example, concrete context information, basis context information, and abstract context information. The concrete context information is unprocessed data, and may be data that is collected via a sensor or application program installed within the device 1000 or via a cloud server. The concrete context information may include, for example, the latitude/longitude of a GPS, and a WiFi ssid. Information included in the table of FIG. 21 may be the concrete context information. The basis context information may be information which is identified as statistical data that is created by collecting concrete context information for a certain period of time. The abstract context information is information obtained from the concrete context information and the basis context information. The abstract context information may be dependent upon a domain. Further, the server 2000 infers the abstract context information based on context information. For example, "Samsung Coex Mall" is identified as a location of the device 1000 based on a GPS value (37.511238, 127.059602) and it is determined that the identified location is similar to a location listed in a user's event schedule. And it is determined that a standstill state of the device 1000 is maintained for a predetermined period of time due to an analysis of the GPS and accelerometer of the device 1000. And a Bluetooth ID of a participant's device registered in the event schedule of the user may be recognized.

The server 2000 may identify a context item and match the context item with a predetermined service, using the concrete context information, the basis context information, and the abstract context information, thereby generating the context model.

In operation S215, the service provider 3000 may transmit a purchase request for the context item to the server 2000. The service provider 3000 may receive information about the context model from the server 2000 and may determine, based on the information about the context model, a context item that is to be matched with a service provided by the service provider 3000. The service provider 3000 may select all of the context items included in a context model by selecting the context model. Alternatively, the service provider 3000 may select some of the context items included in the context model. The service provider 3000 may provide the ID of the selected context item or the ID of the context model to the server 2000, and may transmit a purchase request for the selected context item to the server 2000. While transmitting a purchase request for the determined context item to the server 2000, the service provider 3000 may provide the server 2000 with information about a charging method. The charging method may include, for example, an auction method, a group purchasing method, an exclusive purchasing method, a charging method according to the exposure degree of an object, and a charging method according to the utilization of services via an object; but exemplary embodiments are not limited thereto.

In operation S220, the server 2000 matches the service of the service provider 3000 with the context item. The server 2000 matches the service of the service provider 3000 with the context item purchased by the service provider 3000. The server 2000 may confirm that the service provider 3000 purchases the context item selected by the service provider 3000, and may match the context item selected by the service provider 3000 with the service of the service provider 3000. For example, the server 2000 may match 'providing the morning drama A,' which is the service provided by the service provider 3000, with the context items 'weekday mornings,' 'housewife,' and 'TV.'

In operation S225, the server 2000 determines a charging method for the service provider 3000. The server 2000 may determine the charging method for the service provider 3000, based on the information about charging methods provided by the service provider 3000

For example, when the service provider 3000 requests to purchase context items A, B, and C of a service A via an auction method, the server 2000 may compare a bid amount submitted by the service provider 3000 against a bid amount submitted by another service provider (not shown) that has also requested to purchase the same context items A, B, and C of the service A via the auction method. When the bid amount submitted by the service provider 3000 is higher than the bid amount submitted by the other service provider, the server 2000 may determine that the service provider 3000 is charged according to the bid amount proposed by the service provider 3000.

For example, when the service provider 3000 requests to purchase the context items A, B, and C of the service A via a group purchasing method, the server 2000 may compare a bid amount submitted by the service provider 3000 with a bid amount submitted by another service provider (not shown) that has also requested to purchase the same context items A, B, and C of the service A via the group purchasing method. The server 2000 may determine the probabilities that an object for accessing a service of the service provider 3000 and an object for accessing a service of the other service provider would be exposed to users, based on the bid amount submitted by the service provider 3000 and the bid amount submitted by the other service provider. The server 2000 may determine how to charge the service provider 3000, based on exposure rate of the object for accessing the service of the service provider 3000 and a purchase fee proposed by the service provider 3000.

In operation S230, the server 2000 generates an object for accessing the service of the service provider 3000. The object denotes a user interface used to use the service of the service provider 3000. The object may include at least one piece of link information for receiving a service from the service provider 3000.

The server 2000 may provide the service provider 3000 with a pre-set template used to generate an object, and may receive a template edited by the service provider 3000 from the service provider 3000.

In this case, the server 2000 may provide an editing tool for editing a template to the service provider 3000, and the service provider 3000 may insert service information associated with a service provided by the service provider 3000 into the template using the editing tool. The service information is information associated with the service provided by the service provider 3000, and may include, for example, the title of the service, a link address for downloading content associated with the service, and an image associated with the service; however exemplary embodiments are not limited thereto.

The server 2000 may generate an object for accessing the service provided by the service provider 3000, using the edited template received from the service provider 3000. The server 2000 may also insert information about a reason why the object for accessing a service provided by the service provider 3000 is recommended to the device 1000, into the object. The server 2000 may generate the object by combining the template received from the service provider 3000 and a template received from at least one other service provider (not shown). However, when the service provider 3000 purchases a context item using an exclusive purchasing method, the server 2000 may insert the template of the service provider 3000, and not that of the other service provider (not shown), into the object.

The server 2000 may match the generated object with the context item purchased by the service provider 3000.

In operation S235, the server 2000 determines a current situation regarding the device 1000. The server 2000 may determine the current situation regarding the device 1000 by monitoring, for example, a user of the device 1000, the type of the device 1000, the location of the device 1000, a current time, a day of the week, and an application that is being performed by the device 1000.

In operation S240, the server 2000 provides the generated object to the first device 1000-1. The server 2000 may compare a situation corresponding to the context item purchased by the service provider 3000 with the current situation of the device 1000 and may provide the object to the device 1000 based on a result of the comparison. When the situation corresponding to the context item purchased by the service provider 3000 is the same as or similar to the current situation of the first device 1000-1, the server 2000 may provide the object for accessing the service of the service provider 3000 to the first device 1000-1.

In operation S245, the first device 1000-1 accesses a service provided by the service provider 3000, using the received object. The object includes link information for receiving data associated with the service provided by the service provider 3000, and the first device 1000-1 may access a service from the service provider 3000 using the link information included in the object.

The first device 1000-1 may provide information about the object and service utilization regarding the service received from the service provider 3000, to the server 2000. For example, the first device 1000-1 may provide the server 2000 with the number of times the object is executed, the number of times the service provided by the service provider 3000 is used via the object, the number of times predetermined data, items, and products are purchased via the service provided by the service provider 3000, and the purchase fees for the predetermined data, the items, and the products.

In operation S250, the server 2000 calculates a fee that is to be charged to the service provider 3000. The server 2000 may calculate the fee that is to be charged to the service provider 3000, based on the charging method of the service provider 3000, the number of times the service provider 3000 provides an object, the number of times the object of the service provider 3000 is performed by the device 1000, the number of times the device 1000 uses a service via the object of the service provider 3000, and a fee paid by the device 1000 to use a service via the object of the service provider 3000.

Figure 3:
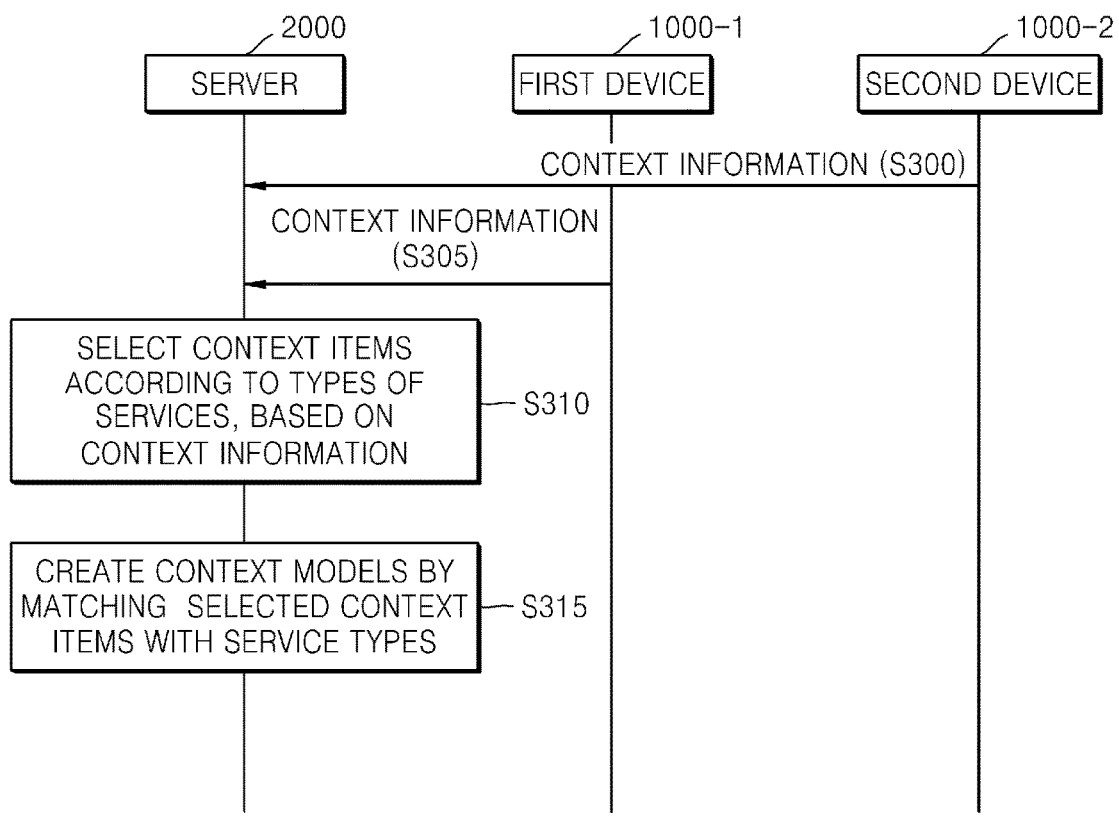
FIG. 3 is a flowchart illustrating a method in which a server included in the system of FIG. 1 models context information.

FIG. 3 is a flowchart illustrating a method in which the server 2000 models context information, according to an exemplary embodiment.

In operation S300, the server 2000 receives context information from the second device 1000-2. In operation S305, the server 2000 receives context information from the first device 1000-1. The context information denotes information about a service which the device 1000 uses and a situation in which the device 1000 uses the service. The device 1000 may use various types of services in various situations, and context information about the situations in which the device 1000 utilizes the services may be collected by the server 2000. Context items denote details included in the context information. For example, the context items may include a user who used a service, the type of a device that used the service, service usage time, a location where the service is used, another user who also used the service, and an application executed by the device; however, exemplary embodiments are not limited thereto.

In operation S310, the server 2000 selects context items according to the types of services, based on the context information. The server 2000 may evaluate a situation where a service is used a preset number of times or more, and may select at least one context item based on the situation. For example, the server 2000 may recommend at least one of a user who used a service, the type of a device that used the service, service usage time, a location where the service is used, another user who also used the service, and an application executed by the device, as the context item of the service. For example, when housewives watch a morning drama via the TV on weekday mornings a preset number of times or more, the server 2000 may recommend context items 'weekday mornings,' 'housewife,' and 'TV,' as the context items of a morning drama broadcasting service. For example, when a user is in a school and shares pictures being taken in the school with his or her friends a preset number of times or more, the server 2000 may recommend context items 'school,' 'friend,' and 'the present,' as the context items of a picture sharing service. For example, when workers use taxis around their houses on weekday mornings a preset number of times or more often, the server 2000 may recommend context items 'weekday mornings,' 'worker,' and 'around house,' as the context items of a taxi recommending service.

In operation S315, the server 2000 may create context models by matching the selected context items with service types. The server 2000 may create a context model by matching at least one of the selected context items with a service type.

For example, the server 2000 may create a context model by matching at least one of the context items 'weekday mornings,' 'housewife,' and 'TV' with the morning drama broadcasting service. For example, the server 2000 may create a context model by matching at least one of the context items 'school,' friend; and 'the present' with the picture sharing service. For example, the server 2000 may create a context model by matching at least one of the context items 'weekday mornings,' 'worker,' and 'around house' with the taxi recommending service.

Information about the created context model may be provided to the service provider 3000, and the service provider 3000 may use the context model in order to determine a context item that is to be matched with a service provided by the service provider 3000.

Figure 4:
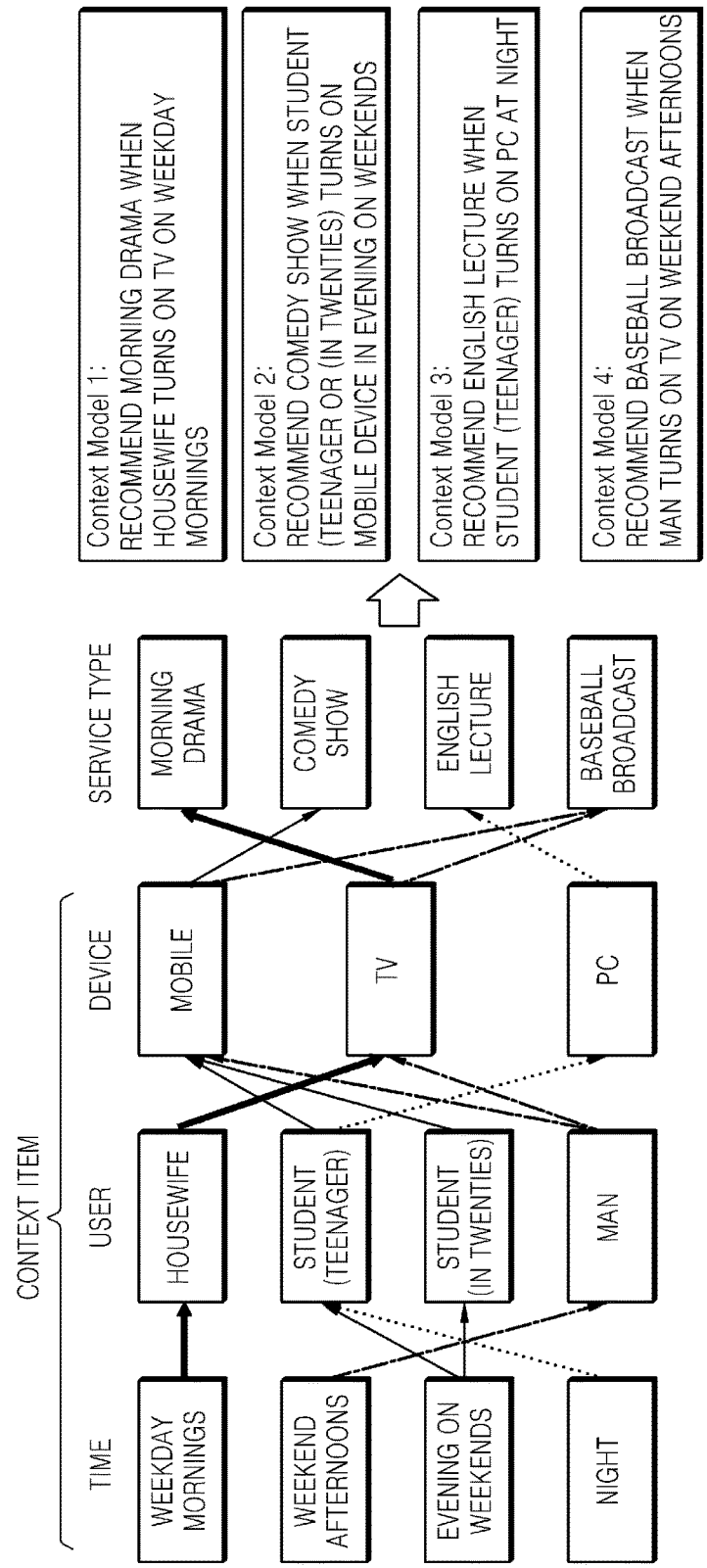
FIG. 4 is a block diagram illustrating context models generated in relation to broadcasting services, according to an exemplary embodiment.

FIG. 4 is a block diagram illustrating context models created in relation to a broadcasting service, according to an exemplary embodiment.

Referring to FIG. 4, the context model may include a plurality of context items and service types matched with the plurality of context items. The context items may include, for example, items associated with service usage time, items associated with the users who use services, and items associated with devices that use the services. The context items associated with service usage time may include, for example, 'weekday mornings,' 'weekend afternoons,' evening on weekends' and 'night.' The context items associated with the users who use services may include, for example, 'housewife,' 'student (teenager),' 'student (in twenties)' and 'man.' The context items associated with the devices that use services may include, for example, 'mobile device,' 'TV,' and 'PC.'

The types of broadcasting services may include, for example, 'morning drama,' 'comedy show,' 'English lecture,' and 'baseball broadcast.'

The server 2000 may ascertain a situation where each service is used a preset number of times or more, and may recommend a context item for each service. For example, the server 2000 may recommend context items 'weekday mornings,' 'housewife,' and 'TV,' as the context items of a morning drama broadcasting service. For example, the server 2000 may recommend context items 'evening on weekends,' 'students (in 10's and 20's),' and 'mobile device,' as the context items of a comedy show broadcasting service.

For example, the server 2000 may create a context model 1 by matching at least one of the context items 'weekday mornings,' 'housewife,' and 'TV' with the morning drama broadcasting service. For example, the server 2000 may create a context model 2 by matching the context items 'evening on weekends,' 'students (in 10's and 20's),' and 'mobile device' with the comedy show broadcasting service.

Figure 5:
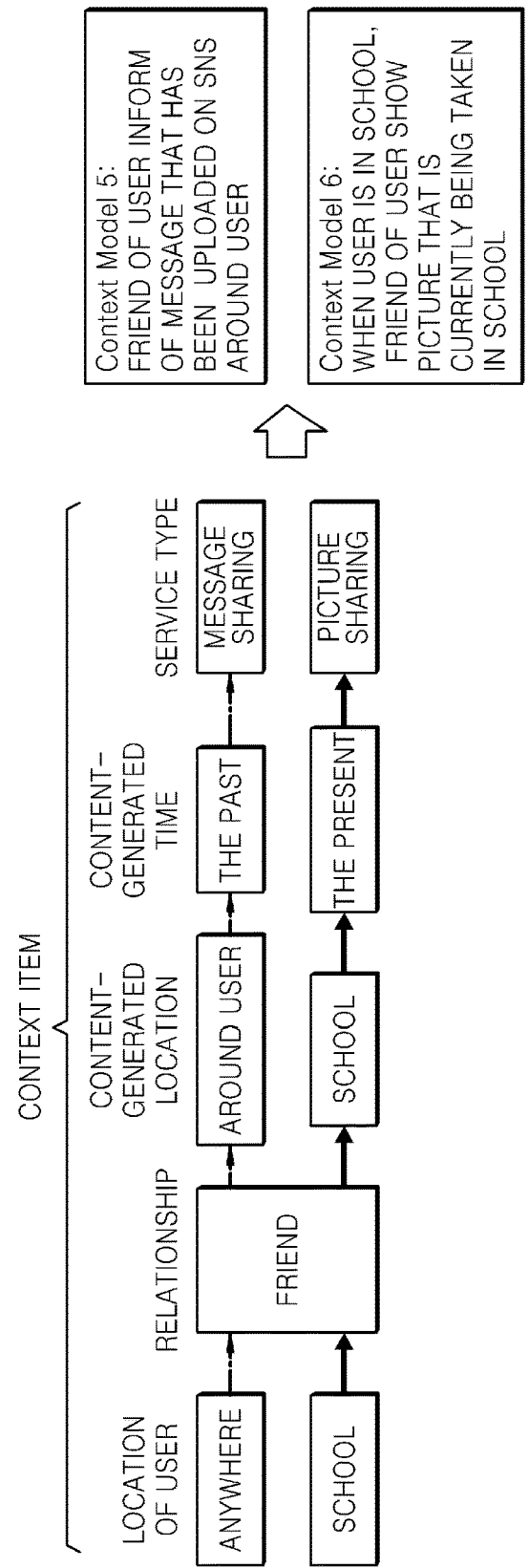
FIG. 5 is a block diagram illustrating context models generated in relation to content sharing services, according to an exemplary embodiment.

FIG. 5 is a block diagram illustrating context models generated in relation to a content sharing service, according to an exemplary embodiment.

Referring to FIG. 5, context items may include a context item associated with the location of a user, a context item associated with a relationship between the user and a sharer of content, a context item associated with a content-generated location, and a context item associated with a content-generated time (i.e., a time point when the content is generated). The context item associated with the location of a user may include, for example, 'anywhere' and 'school.' The context item associated with the relationship between a user and a sharer may include, for example, 'friend.' The context item associated with the content-generated location may include, for example, 'around a user' and 'school.' The context item associated with the content-generated time may include, for example, 'the past' and 'the present.'

The types of services associated with content sharing may include, for example, 'message sharing' and 'picture sharing.'

The server 2000 may evaluate a situation where each service is used a preset number of times or more, and may recommend a context item as the context item of each service. For example, the server 2000 may recommend the context items 'anywhere,' 'friend,' 'around a user,' and "the past", as the context items of a message sharing service. For example, the server 2000 may recommend the context items 'school,' 'friend,' 'school,' and "the present", as the context items of a picture sharing service.

For example, the server 2000 may create a context model 5 by matching at least one of the context items 'anywhere,' 'friend,' 'around a user,' and "the past" with the message sharing service. For example, the server 2000 may create a context model 6 by matching at least one of the context items 'school,' 'friend,' 'school,' and 'the present' with the picture sharing service.

Figure 6:
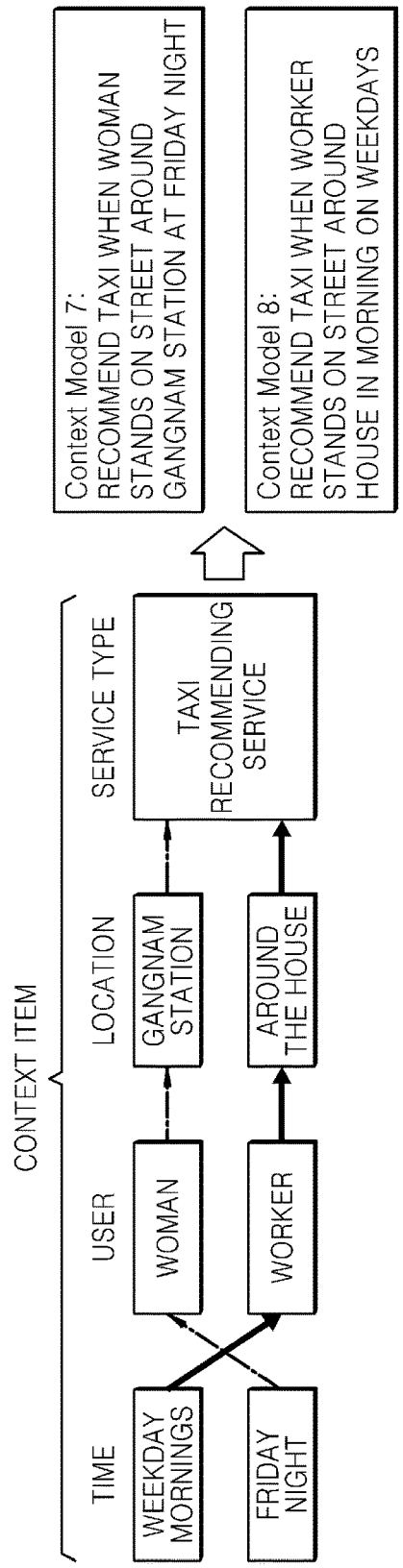
FIG. 6 is a block diagram illustrating context models generated in relation to a taxi recommendation service, according to an exemplary embodiment.

FIG. 6 is a block diagram illustrating context models created in relation to a taxi recommending service, according to an exemplary embodiment.

Referring to FIG. 6, context items may include context items associated with service usage time, context items associated with users who use services, and context items associated with service-used locations (ex: locations where the services are to be used). The context items associated with service usage time may include, for example, 'weekday mornings' and 'Friday night.' The context items associated with the users who use services may include, for example, 'woman' and 'worker.' The context item associated with the service-used locations may include, for example, 'Gangnam station' and 'around the house.'

The server 2000 may evaluate a situation where the taxi recommending service is used a preset number of times or more, and may recommend a context item for the taxi recommending service. For example, the server 2000 may recommend the context items 'Friday night,' 'woman,' and 'Gangnam station,' for the taxi recommending service. For example, the server 2000 may recommend the context items 'weekday mornings,' 'worker,' and 'around the house,' for the taxi recommending service.

For example, the server 2000 may create a context model 7 by matching at least one of the context items 'Friday night,' 'woman,' and 'Gangnam station' with the taxi recommending service. For example, the server 2000 may create a context model 8 by matching at least one of the context items 'weekday mornings,' 'worker,' and 'around the house' with the taxi recommending service.

Figure 7:
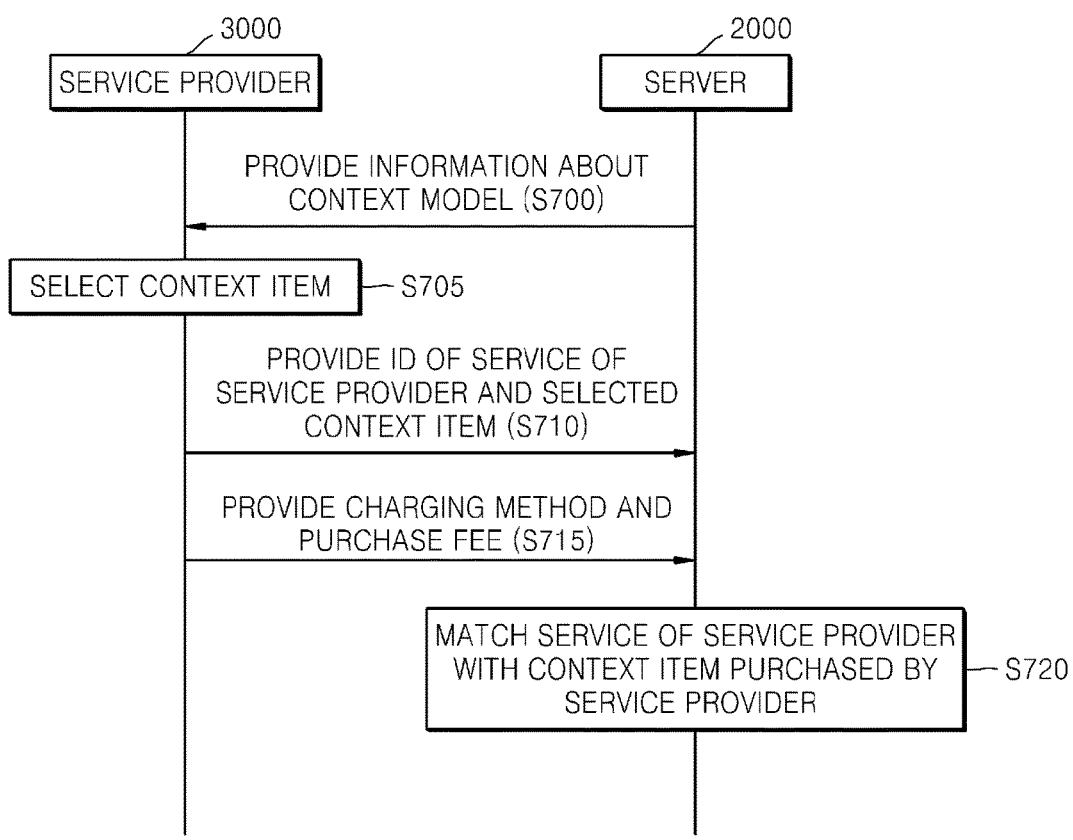
FIG. 7 is a flowchart illustrating a method in which the service provider included in the system of FIG. 1 purchases a context item.

FIG. 7 is a flowchart illustrating a method in which the service provider 3000 purchases a context item, according to an exemplary embodiment.

In operation S700, the server 2000 provides information about a context model to the service provider 3000. The information about a context model may include information about matching of a service type with a context item selected by the server 2000. The server 2000 may identify a context model associated with a service provided by the service provider 3000, and may provide information about the identified context model to the service provider 3000. For example, when a service provided by the service provider 3000 is a broadcasting service, the server 2000 may provide at least one of a context model associated with the morning drama broadcasting service, a context model associated with the comedy show broadcasting service, a context model associated with the English lecture broadcasting service, and a context model associated with the baseball broadcast broadcasting service to the service provider 3000.

In operation S705, the service provider 3000 may select a context item based on the context model. The service provider 3000 may select all of the context items included in a context model by selecting the context model. Alternatively, the service provider 3000 may select some of the context items included in the context model.

The service provider 3000 may select at least one of the services that are provided by the service provider 3000, and may select a context item for the selected service. For example, when a morning drama broadcasting service is matched with the context items 'weekday mornings,' 'housewife, and 'TV' in the context model, the service provider 3000 may select a morning drama A from among the services that are provided by the service provider 3000 and may select the context items 'weekday mornings,' 'housewife,' and 'TV' as the context items of the morning drama A.

In operation S710, the service provider 3000 provides an ID of the selected service and the selected context item to the server 2000. The service provider 3000 may transmit a purchase request for the context item selected for the selected service to the server 2000. For example, when the service provider 3000 selects the morning drama A and selects the context items 'weekday mornings,' 'housewife,' and 'TV' for the selected morning drama A, the service provider 3000 may provide the context items 'morning drama A,' 'morning in weekdays,' 'housewife,' and 'TV' to the server 2000. The service provider 3000 may transmit a purchase request for the context items 'morning drama A,' 'morning in weekdays,' 'housewife,' and 'TV' to the server 2000.

In operation S715, the service provider 3000 provides information about a charging method and a purchase fee for the selected context item to the server 2000. The service provider 3000 may provide information about the charging method related to and the fee charged for the selected context item, to the server 2000. Based on the context item purchased by the service provider 3000, the service provided by the service provider 3000 is provided to the device 1000, and thus the server 2000 may charge the service provider 3000 a predetermined fee. In this case, the server 2000 may determine a fee that is to be charged to the service provider 3000, based on the charging method and fee provided by the service provider 3000. The charging method may include, for example, an auction method, a group purchasing method, an exclusive purchasing method, a charging method according to the exposure degree of an object, and a charging method according to service utilization via the object; however, exemplary embodiments are not limited thereto.

In operation S720, the server 2000 matches the service provided by the service provider 3000 with the context item purchased by the service provider 3000. The server 2000 may confirm that the service provider 3000 purchases the context item selected by the service provider 3000, and may match the context item selected by the service provider 3000 with the service selected by the service provider 3000. For example, when the service provider 300 selects an auction method as a purchasing method and a bid amount submitted by the service provider 3000 is higher than that of another service provider, the server 2000 may finally determine to sell a context item to the service provider 3000. For example, the server 2000 may match the morning drama A of the service provider 3000 with the context items 'weekday mornings,' 'housewife,' and 'TV.'

When the service provider 300 selects a group purchasing method as the purchasing method, the server 2000 may match the service provided by the service provider 3000 with the context item purchased by the service provider 3000 and the probability of exposure of the service provided by the service provider 3000.

FIG. 8 is a table showing an example in which the service provider 3000 determines the type of service associated with a context model and determines a charging method for the determined service, according to an exemplary embodiment.

Referring to FIG. 8, a service provider AA may select services 'morning drama,' 'comedy show,' and 'baseball broadcast.' The service provider AA may determine to purchase a context item associated with the service 'morning drama' via an auction method and may determine to purchase a context item associated with the service 'comedy show' via a group purchasing method. The service provider AA may determine to purchase a context item associated with the service 'baseball broadcast' via a charging method depending on a service usage fee.

A service provider BB may select the services 'morning drama,' 'comedy show,' and 'English lecture.' The service provider BB may determine to purchase a context item associated with the service 'morning drama' via an auction method and may determine to purchase a context item associated with the service 'comedy show' via a group purchasing method. The service provider 'BB' may determine to purchase a context item associated with the service 'English lecture' via a charging method that depends on object exposure.

FIG. 9 is a table showing an example in which the service provider 3000 purchases a context model, according to an exemplary embodiment.

Referring to FIG. 9, the service provider AA may select a morning drama A and may select context items 'weekday mornings,' 'housewife,' and 'TV' for the morning drama A. Accordingly, when a housewife turns on the TV on a weekday morning, an object via which the housewife may watch the morning drama A of the service provider AA may be displayed on the TV.

The service provider BB may select a morning drama B and may select context items 'weekday mornings' and 'TV' for the morning drama B. Accordingly, when any user turns on the TV on a weekday morning, an object via which the user may watch the morning drama B of the service provider BB may be displayed on the TV.

Figure 10:
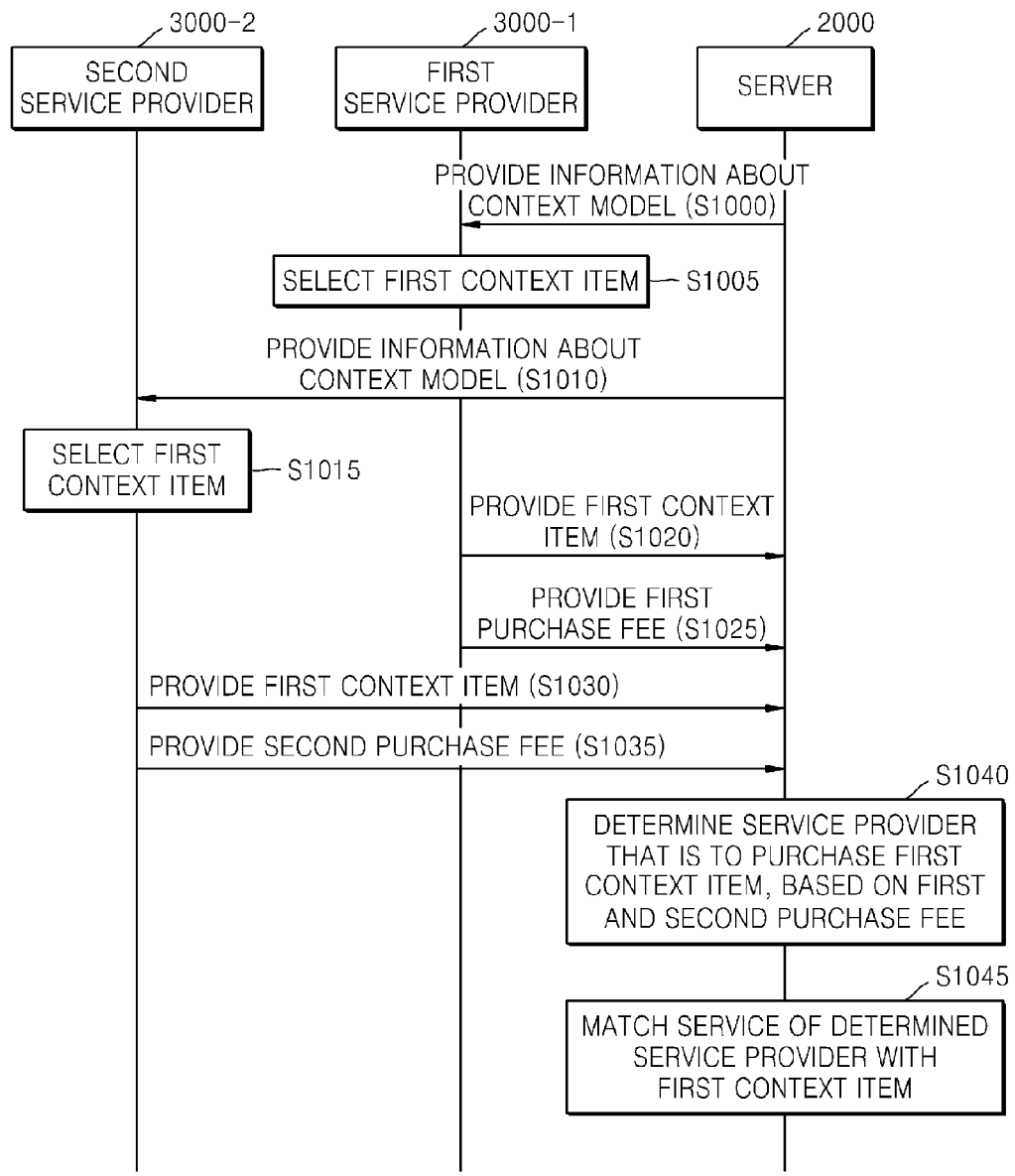
FIG. 10 is a flowchart illustrating a method in which the server purchases a context item via an auction method.

FIG. 10 is a flowchart illustrating a method in which the server 2000 purchases a context item via an auction method, according to an exemplary embodiment.

In operation S1000, the server 2000 provides information about a context model to a first service provider 3000-1. The information about a context model may include information about matching of a service type with a context item recommended by the server 2000. The server 2000 may identify a context model associated with a service provided by the first service provider 3000-1, and may provide information about the identified context model to the first service provider 3000-1.

In operation S1005, the first service provider 3000-1 may select a first context item based on the context model. The first service provider 3000-1 may select the service provided by the first service provider 3000-1, and may select the first context item for the selected service.

In operation S1010, the server 2000 provides information about a context model to a second service provider 3000-2. The information about a context model may include information about matching of a service type with a context item recommended by the server 2000. The server 2000 may identify a context model associated with the service provided by the second service provider 3000-2, and may provide information about the identified context model to the second service provider 3000-2.

In operation S1015, the second service provider 3000-2 may select the first context item based on the context model. In this case, the first context item selected by the second service provider 3000-2 may be the same as the first context item selected by the first service provider 3000-1. The second service provider 3000-2 may select the service provided by the second service provider 3000-2, and may select the first context item for the selected service.

In operation S1020, the first service provider 3000-1 may provide information about the first context item to the server 2000. In operation S1025, the first service provider 3000-1 may provide a first purchase fee to the server 2000 in order to purchase the first context item.

In operation S1030, the second service provider 3000-2 may provide information about the first context item to the server 2000. In operation S1035, the second service provider 3000-2 may provide a second purchase fee to the server 2000 in order to purchase the first context item.

In operation S1040, the server 2000 determines a service provider that is to purchase the first context item. For example, when the first purchase fee is higher than the second purchase fee, the server 2000 may sell the first context item to the first service provider 3000-1 that has proposed the first purchase fee.

In operation S1045, the server 2000 may match a service of the determined service provider with the first context item. For example, when the first purchase fee is higher than the second purchase fee, the server 2000 may match the service of the first service provider 3000-1 with the first context item.

Figure 11:
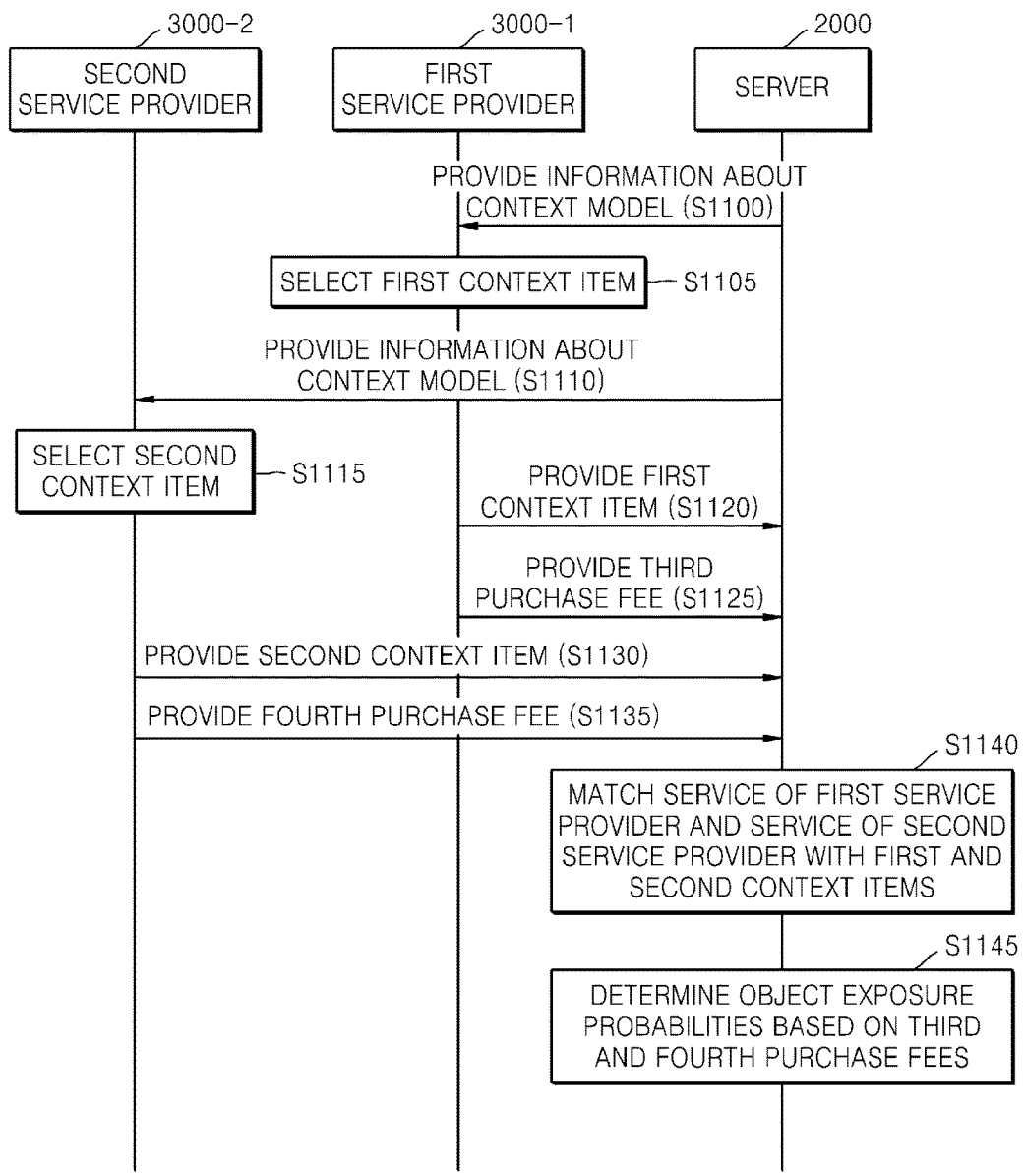
FIG. 11 is a flowchart illustrating a method in which the server sells a context item via a group purchasing method.

FIG. 11 is a flowchart illustrating a method in which the server 200 sells a context item via a group purchasing method, according to an exemplary embodiment.

In operation S1100, the server 2000 provides information about a context model to the first service provider 3000-1. The information about a context model may include information about matching of a service type with a context item selected by the server 2000. The server 2000 may identify a context model associated with a service provided by the first service provider 3000-1, and may provide information about the identified context model to the first service provider 3000-1.

In operation S1105, the first service provider 3000-1 may select a first context item based on the context model. The first service provider 3000-1 may select the service provided by the first service provider 3000-1, and may select a first context item for the selected service.

In operation S1110, the server 2000 provides information about a context model to the second service provider 3000-2. The information about a context model may include information about matching of a service type with a context item recommended by the server 2000. The server 2000 may identify a context model associated with the service provided by the second service provider 3000-2, and may provide information about the identified context model to the second service provider 3000-2.

In operation S1115, the second service provider 3000-2 may select the second context item based on the context model. In this case, the second context item selected by the second service provider 3000-2 may be the same as the first context item selected by the first service provider 3000-1. The second service provider 3000-2 may select the service provided by the second service provider 3000-2, and may select the second context item for the selected service.

In operation S1120, the first service provider 3000-1 may provide information about the first context item to the server 2000. In operation S1125, the first service provider 3000-1 may provide a third purchase fee to the server 2000 in order to purchase the first context item.

In operation S1130, the second service provider 3000-2 may provide information about the second context item to the server 2000. In operation S1135, the second service provider 3000-2 may provide a fourth purchase fee to the server 2000 in order to purchase the second context item.

In operation S1140, the server 2000 matches the service of the first service provider 3000-1 with the first context item and matches the service of the second service provider 3000-2 with the second context item.

In operation S1145, based on the third purchase fee and the fourth purchase fee, the server 2000 determines the exposure probability of an object for accessing the service of the first service provider 3000-1 and the exposure probability of an object for accessing the service of the second service provider 3000-2. For example, the third purchase fee of the first service provider 3000-1 may be 30 million won, and the fourth purchase fee of the second service provider 3000-2 may be 10 million won. In this case, the server 2000 may determine the exposure probability of the object for accessing the service of the first service provider 3000-1 to be 75%, and may determine the exposure probability of the object for accessing the service of the second service provider 3000-2 to be 25%.

FIG. 12 is a table showing an example in which an exposure probability of an object is determined via a group purchasing method, according to an exemplary embodiment.

Referring to FIG. 12, the service provider AA and the service provider BB may both purchase the same service and the same context item. For example, the service providers AA and BB may select the service 'morning drama' and may select the context items 'weekday mornings,' 'housewife,' and 'TV' for the selected service 'morning drama.' The purchase fee paid by the service provider AA may be 30 million won, and the purchase fee paid by the service provider BB may be 10 million won.

Based on the purchase fees of the service providers AA and BB, the server 2000 may determine the exposure probability of an object for watching the service 'morning drama' of the service provider AA to be 75%, and may determine the exposure probability of an object for watching the service 'morning drama' of the service provider BB to be 25%. In this case, when a housewife turns on the TV on weekday mornings, the server 2000 may provide the object for watching the service 'morning drama' of the service provider AA to the TV at a 75% probability, and may provide the object for watching the service 'morning drama' of the service provider BB to the TV at a 25% probability.

Figure 13:
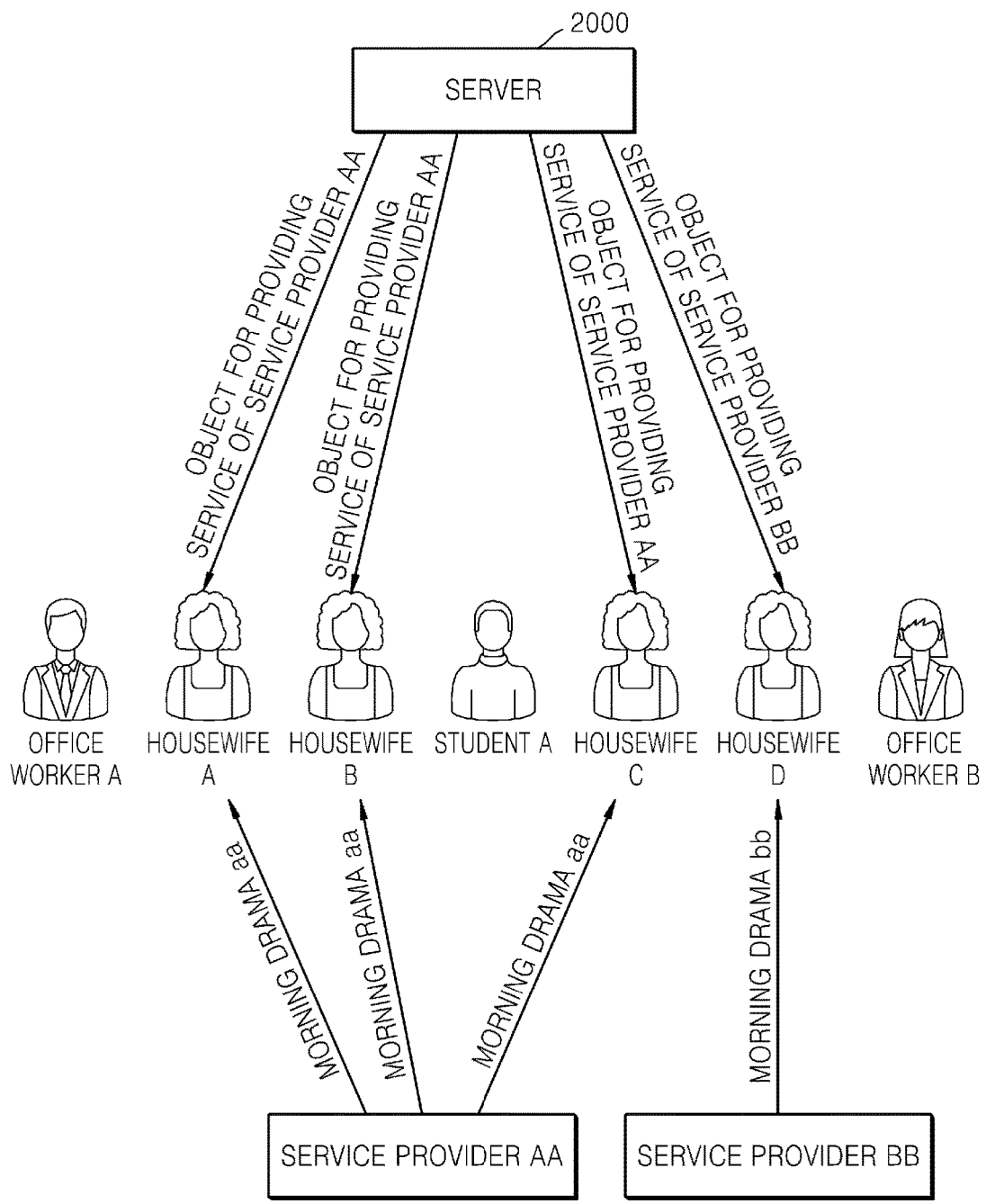
FIG. 13 illustrates an example in which the server provides a morning drama aa of a service provider AA and a morning drama bb of a service provider BB.

FIG. 13 illustrates an example in which the server 200 provides a morning drama aa of the service provider AA and a morning drama bb of the service provider BB, according to an exemplary embodiment. Referring to FIG. 13, the service provider AA and the service provider BB may both purchase the same context item as illustrated in FIG. 12.

Referring to FIG. 13, an office worker A, an office worker B, a housewife A, a housewife B, a housewife C, a housewife D, and a student A may turn on TVs on a weekday morning. In this case, the server 2000 may provide an object for providing a service of the service provider AA to the TVs of three of the four housewives A, B, C, and D, that is, 75% of the four housewives A, B, C, and D, and may provide an object for providing a service of the service provider BB to the TV of one of the four housewives A, B, C, and D, that is, 25% of the four housewives A, B, C, and D. For example, the server 2000 may provide the object for providing a service of the service provider AA to the TVs of the three housewives A, B, and C, and may provide the object for providing a service of the service provider BB to the TV being watched by the housewife D.

The TVs of the three housewives A, B, and C may receive the morning drama aa from the service provider AA via the received object, and the TV being watched by the housewife D may receive the morning drama bb from the service provider BB via the received object.

Figure 14:
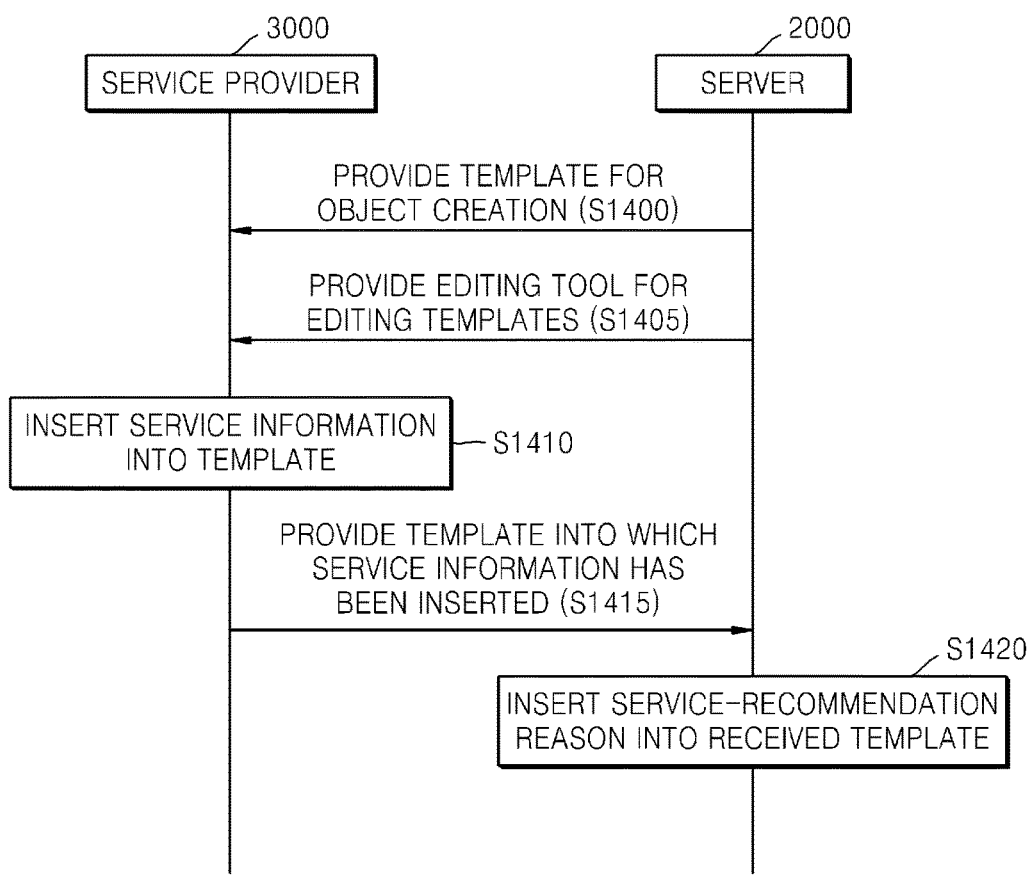
FIG. 14 is a flowchart illustrating a method in which the server generates an object for accessing a service of the service provider.

FIG. 14 is a flowchart illustrating a method in which the server 2000 generates an object for accessing a service provided by the service provider 3000, according to an exemplary embodiment.

In operation S1400, the server 2000 provides a template for object generation to the service provider 3000. The template for object generation may include a plurality of regions, for example, a region for inserting a description of a service, a region for inserting an image of the service, and a region for inserting a menu and icons for using the service; however, exemplary embodiments are not limited thereto. The server 2000 may predetermine the structure of the template for object generation according to the type of service.

The template may also be predetermined according to a user or the device 1000. The server 2000 may predetermine templates that are to be provided to the devices 1000 of users according to the tastes of the users, and may provide the determined templates to the service provider 3000.

In operation S1405, the server 2000 provides an editing tool for editing templates to the service provider 3000.

In operation S1410, the service provider 3000 inserts service information about the service provided by the service provider 3000 into the template received from the server 2000. The service provider 3000 may edit the template using the editing tool received from the server 2000. The service provider 3000 may insert the service information into each region included in the template using the editing tool. The service information is information associated with the service provided by the service provider 3000, and may include, for example, the title of the service, a link address for downloading content associated with the service, and an image associated with the service; however exemplary embodiments are not limited thereto.

In operation S1415, the service provider 3000 provides a template into which the service information has been inserted, to the server 2000.

In operation S1420, the server 2000 inserts a service-recommendation reason into the template into which the service information has been inserted. The server 2000 may insert a reason why the service provided by the service provider 3000 is recommended to the device 1000, into the template received from the service provider 3000. An object may be generated using a template into which the service-recommendation reason has been inserted. The object may include only a template for using the service provided by the service provider 3000; however, exemplary embodiments are not limited thereto. The object may include both a template for using the service provided by the service provider 3000 and a template for using the service provided by another service provider (not shown). For example, the server 2000 may produce or select a service-recommendation reason, based on the date, time, and location where content provided by a service is produced, the history of use of content by a user, and a relationship between a user of the content and a user of the device 1000. In this case, the date, time, and location where the content is produced may be acquired from metadata of the content. The relationship between a user of the content and a user of the device 1000 may be ascertained based on relation information stored in an SNS server, the history of message exchanges between users, and the history of content sharing between users. However, exemplary embodiments are not limited thereto.

Figure 15:
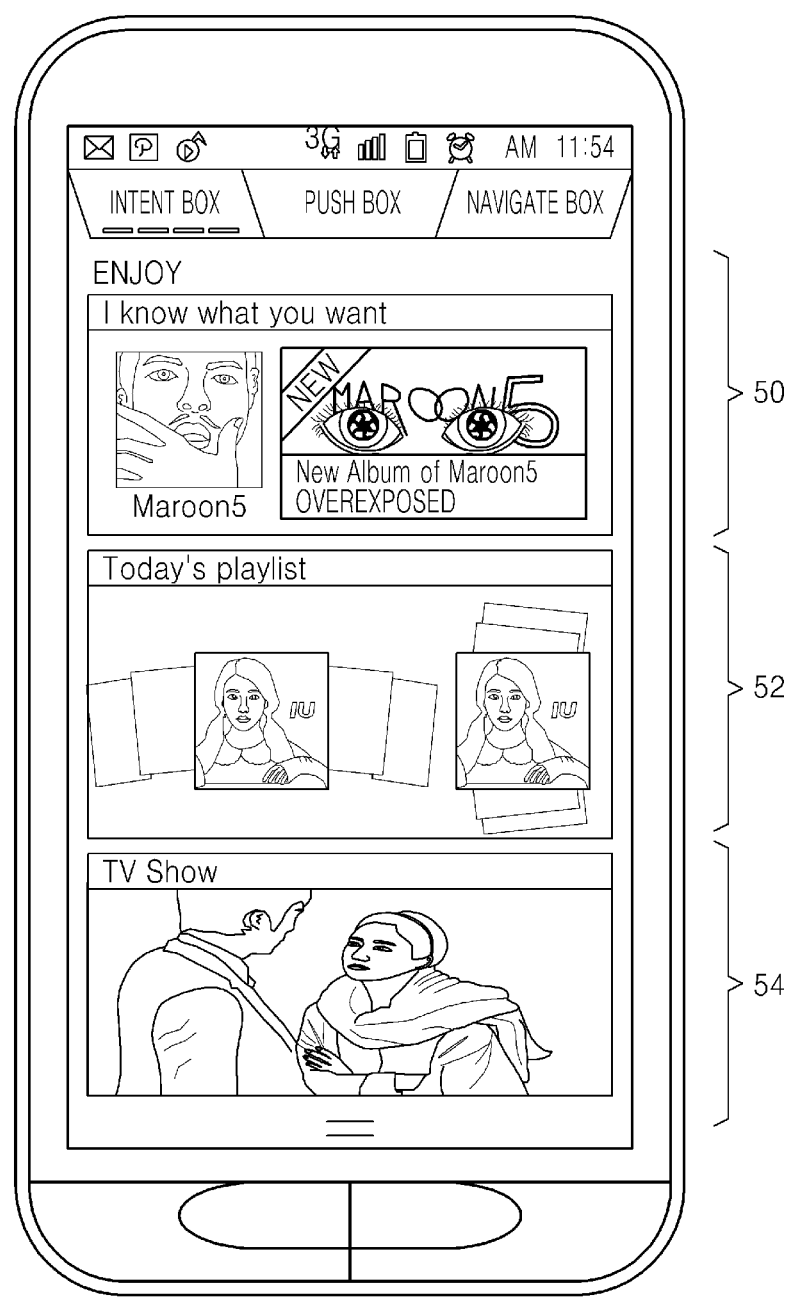
FIG. 15 illustrates an object for accessing a user, according to an exemplary embodiment.

FIG. 15 illustrates an object for accessing a service, according to an exemplary embodiment;

Referring to FIG. 15, the object may include a template 50 into which service information of the first service provider 3000-1 has been inserted, a template 52 into which service information of the second service provider 3000-2 has been inserted, and a template 54 into which service information of a third service provider 3000-3 has been inserted. The object may be displayed on the screen of the device 1000 as a user touches and drags an upper bar of the device 1000; however, exemplary embodiments are not limited thereto. The object may be displayed on an unlock screen of the device 1000. When an event has occurred, the object may be displayed via a pop-up window on the screen of the device 1000.

Figure 16:
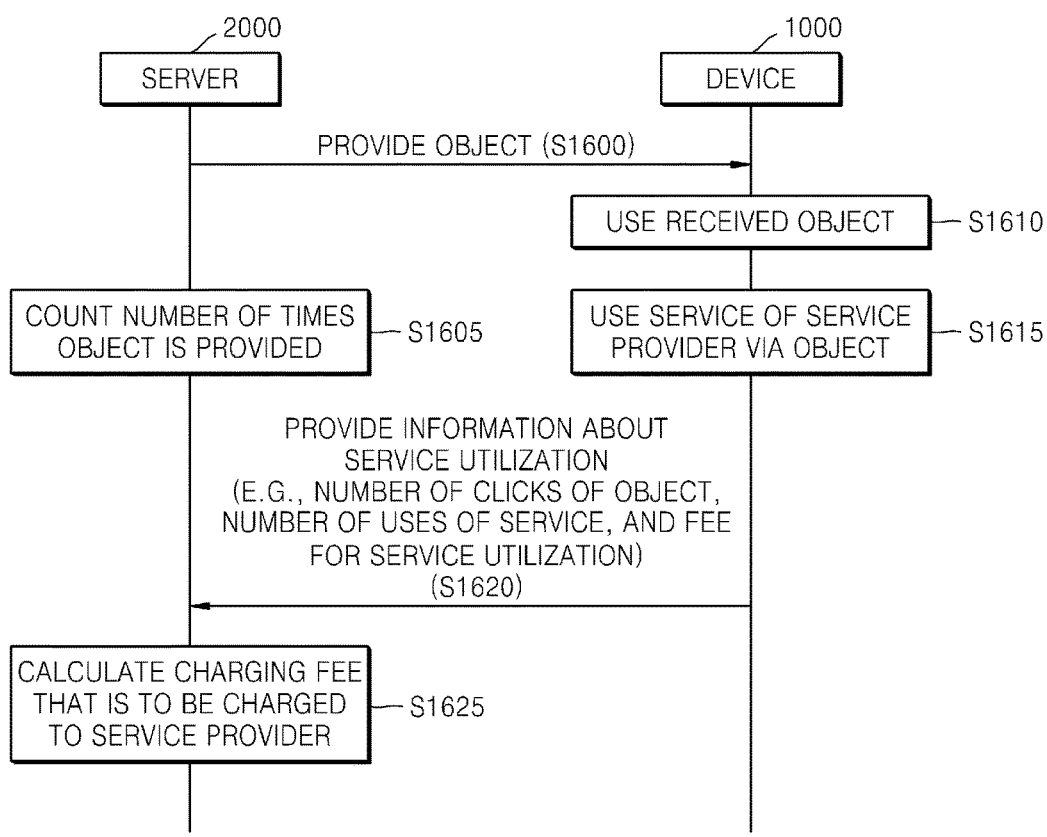
FIG. 16 is a flowchart illustrating a method in which the server calculates a fee that is to be charged to the service provider.

FIG. 16 is a flowchart illustrating a method in which the server 2000 calculates a fee that is to be charged to the service provider 3000, according to an exemplary embodiment.

In operation S1600, the server 2000 provides an object to the device 1000. The server 2000 may monitor a current situation of the device 1000 and may determine a context item corresponding to the current situation of the device 1000. The context item corresponding to the current situation regarding the device 1000 may be a context item similar to or the same as the current situation regarding the device 1000. The server 2000 may determine which service provider 3000 has purchased the context item, and may provide the device 1000 with an object for accessing a service provided by the determined service provider 3000.

In operation S1605, the server 2000 counts the number of times that the server 2000 provides the object to the device 1000. The server 2000 may count the number of times that the server 2000 provides the object to the device 1000, for each service provided by the service provider 3000.

In operation S1610, the device 1000 uses the received object. The device 1000 may display the object received from the server 2000 using a host program of the device 1000, and may use the received object when a user clicks on the displayed object. In this case, the device 1000 may display the object using the host program of the device 1000. The device 1000 may count the number of times the object is clicked. The clicking of an object includes a user selecting an object via an input device or a user touching an object via his or her hand or an input tool.

In operation S1615, the device 1000 uses the service provided by the service provider 3000 via the executed object. The device 1000 may receive a service from the service provider 3000 via the executed object, and may purchase contents, data, and products via the received service. The device 1000 may calculate the number of times the service provided by the service provider 3000 is used, and a service usage fee. The device 1000 may also calculate purchase fees for the purchase of contents, data, and products via the service provided by the service provider 3000.

In operation S1620, the device 1000 provides information about service utilization to the server 2000. The device 1000 may provide the server 2000 with the number of times the object is clicked, the number of times the object was executed, the number of times the service was used, the service usage fee, and the purchase fee for the contents, the data, and the products purchased via the service.

However, exemplary embodiments are not limited thereto, and the server 2000 or the service provider 3000 may separately collect the number of times the object was performed, the number of times the service was used, the service usage fee, and the purchase fee for the contents, the data, and the products purchased via the service.

In operation S1625, the server 2000 calculates a charging fee that is to be charged to the service provider 3000. The server 2000 may recognize a charging method of the service provider 3000 and may calculate a charging fee that is to be charged to the service provider 3000 according to the charging method.

When the charging method of the service provider 3000 is an auction method or an exclusive purchasing method, the server 2000 may determine a purchase fee proposed by the service provider 3000 as the charging fee. When the charging method of the service provider 3000 is a group purchasing method, the server 2000 may determine a product of the exposure probability of the object of the service provider 3000 and the purchase fee proposed by the service provider 3000 as the charging fee.

When the charging method of the service provider 3000 is a method of charging a fee according to the degree of exposure of an object, the server 2000 may calculate the charging fee based on at least one of the number of times an object is provided, the number of times the object is clicked, and the number of times the object is executed. In this case, a fee for each time the object is provided to the server 2000, a fee for each time the object is clicked, and a fee for each time the object is executed may be previously set.

When the charging method of the service provider 3000 is a method of charging a fee according to the use of a service via an object, the server 2000 may determine the charging fee based on at least one of the service usage fee and the fee for contents, data, and products purchased via a service. For example, the server 2000 may calculate a commission corresponding to a predetermined percentage of the service usage fee and the fee for the purchase of contents, data, and products via the service, and determine the calculated commission as the fee.

Figure 17:
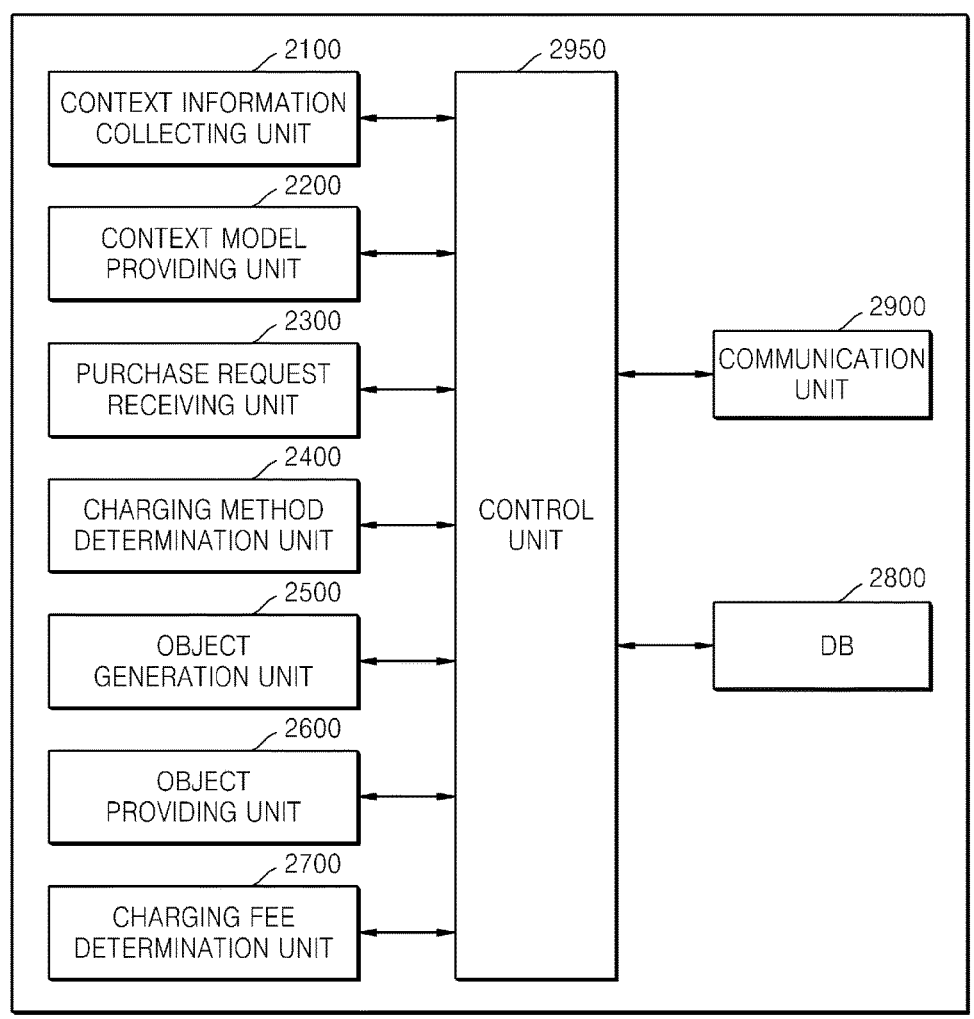
FIG. 17 is a block diagram of a server according to an exemplary embodiment.

FIG. 17 is a block diagram of the server 2000, according to an exemplary embodiment.

Referring to FIG. 17, the server 2000 includes a context information collecting unit 2100, a context model providing unit 2200, a purchase request receiving unit 2300, a charging method determination unit 2400, an object generation unit 2500, an object providing unit 2600, a charging fee determination unit 2700, a database (DB) 2800, a communication unit 2900, and a control unit 2950.

The context information collecting unit 2100 collects context information from the at least one device 1000. The context information receiving unit 2100 may receive the context information in order to create context models. The context information receiving unit 2100 may receive context information in order to determine a current situation of the device 1000. The context information denotes information about a service which the device 1000 uses and a situation in which the device 1000 uses the service. The device 1000 may use various types of services in various situations, and context information about the situations in which the device 1000 utilizes the services may be collected by the context information collecting unit 2100. Context items denote details included in the context information. For example, the context items may include a user who used a service, the type of a device that used the service, service usage time, a location where the service is used, another user who also used the service, and an application executed by the device; however, exemplary embodiments are not limited thereto.

The context model providing unit 2200 models the context information and provides context models to the service provider 3000. The context model providing unit 2200 may create context models by recommending context items according to the types of services. The context model providing unit 2200 may recommend at least one of a user who used a service, the type of a device that used the service, service usage time, a location where the service is used, another user who also used the service, and an application executed by the device, as a context item of the service. For example, if a housewife frequently watches a morning drama via the TV on weekday mornings, the context model providing unit 2200 may recommend context items, such as, 'weekday mornings,' 'housewife,' and 'TV,' for a morning drama broadcasting service.

The context model providing unit 2200 may create context models by matching recommended context items with the types of services. For example, the context model providing unit 2200 may create a context model by matching the context items 'weekday mornings,' 'housewife,' and 'TV' with the morning drama broadcasting service. The context models may be used when the service provider 3000 determines which context item a service provided by the service provider 3000 is to be matched with.

The context model providing unit 2200 may provide at least one of the context information and the context models to the service provider 3000.

The purchase request receiving unit 2300 receives a purchase request for a context model selected by the service provider 3000, from the service provider 3000. The service provider 3000 may select a context model that is to be matched with a service provided by the service provider 3000 from among the context models received from the context model providing unit 2200, and may provide information about the selected context model to the purchase request receiving unit 2300. The service provider 3000 may select a context item from the context items included in the context models received from the context model providing unit 2200, and may provide information about the selected context item to the purchase request receiving unit 2300.

The purchase request receiving unit 2300 matches the service provided by the service provider 3000 with the selected context item. The purchase request receiving unit 2300 may receive a purchase request for the selected context item from the service provider 3000 and may match the service provided by the service provider 3000 with the context item purchased by the service provider 3000. The purchase request receiving unit 2300 may confirm that the service provider 3000 purchases the context item selected by the service provider 3000, and may match the context item purchased and selected by the service provider 3000 with the service provided by the service provider 3000. For example, the purchase request receiving unit 2300 may match the morning drama A, which is the service provided by the service provider 3000, with the context items 'weekday mornings,' 'housewife,' and 'TV.'

The charging method determination unit 2400 determines a charging method for the service provider 3000. The charging method determination unit 2400 may determine the charging method for the service provider 3000, based on the information about charging methods provided by the service provider 3000.

For example, when the service provider 3000 requests to purchase context items A, B, and C of a service A in an auction manner, the charging method determination unit 2400 may compare a bid amount submitted by the service provider 3000 with a bidding fee of another service provider (not shown) that has requested for purchase of the context items A, B, and C for the service A in an auction manner. When the bid amount submitted by the service provider 3000 is higher than the bid amount submitted by the other service provider, the charging method determination unit 2400 may determine that the service provider 3000 is charged according to the bidding fee proposed by the service provider 3000.

For example, when the service provider 3000 requests to purchase the context items A, B, and C of the service A in a group purchasing method, the charging method determination unit 2400 may compare a bid amount submitted by the service provider 3000 with a bidding fee of another service provider (not shown) that has requested to purchase the context items A, B, and C for the service A in a group purchasing method. The charging method determination unit 2400 may determine the probabilities that an object for accessing a service provided by the service provider 3000 and an object for accessing a service of the other service provider are exposed, based on the bid amount submitted by the service provider 3000 and the bid amount submitted by the other service provider. The charging method determination unit 2400 may determine how to charge the service provider 3000, based on the exposure rate of the object for accessing the service provided by the service provider 3000 and a purchase fee proposed by the service provider 3000.

The object generation unit 2500 generates an object for accessing the service provided by the service provider 3000. The object generation unit 2500 may provide the service provider 3000 with a pre-set template used to generate an object, and may receive the template edited by the service provider 3000 from the service provider 3000. In this case, the object generation unit 2500 may provide an editing tool for editing a template to the service provider 3000, and the service provider 3000 may insert service information associated with a service provided by the service provider 3000 into the template using the editing tool. The service information is information associated with the service provided by the service provider 3000, and may include, for example, the title of the service, a link address for downloading content associated with the service, and an image associated with the service; however exemplary embodiments are not limited thereto.

The object generation unit 2500 may generate an object for accessing the service provided by the service provider 3000, using the edited template received from the service provider 3000. The object generation unit 2500 may also insert information about a reason why the object for accessing a service provided by the service provider 3000 is recommended to the device 1000, into the object. The object generation unit 2500 may generate the object by combining the template received from the service provider 3000 and a template received from at least one other service provider (not shown). However, when the service provider 3000 purchases a context item using an exclusive purchasing method, the object generation unit 2500 may insert the template of the service provider 3000, and not that of the other service provider (not shown), into the object.

The object generation unit 2500 may match the generated object with the context model purchased by the service provider 3000. The object generation unit 2500 may match the generated object with the context item purchased by the service provider 3000.

The object providing unit 2600 provides the generated object to the device 1000. The object providing unit 2600 may select the context model according to a current situation of the device 1000 and may provide the device 1000 with the object which is used to use a service provided by the service provider 3000 that requested to purchase the selected context model. The object providing unit 2600 may evaluate a current situation of the device 1000 and may provide the object to the device 1000 based on the current situation of the device 100 and the matched context item. The object providing unit 2600 may monitor, for example, a user of the device 1000, the type of the device 1000, the location of the device 1000, a current time, a day of the week, and an application that is being performed by the device 1000.

The object providing unit 2600 may compare the context item or context model purchased by the service provider 3000 with the current situation of the device 1000 and may provide the object to the device 1000 based on a result of the comparison. The object providing unit 2600 may select a context model based on a result of the monitoring of the current situation of the device 1000 and may provide the device 1000 with an object matched with the selected context model. When the context item purchased by the service provider 3000 is the same as or similar to the current situation of the first device 1000-1, the object providing unit 2600 may provide an object for accessing the service provided by the service provider 3000 to the first device 1000-1.

The charging fee determination unit 2700 calculates a fee that is to be charged to the service provider 3000. The charging fee determination unit 2700 may calculate the fee that is to be charged to the service provider 3000, based on the charging method of the service provider 3000, the number of times the service provider 3000 provides an object, the number of times the object of the service provider 3000 is performed by the device 1000, the number of times the device 1000 uses a service via the object of the service provider 3000, and the fee that is to be charged to the service provider 3000 when the device 1000 uses the object to access the service provided by the service provider 3000.

The DB 2800 stores a variety of information that is necessary by the server 2000 for selling a context item to the service provider 3000, providing the object for providing the service provided by the service provider 3000 to the device 1000, and calculating the fee that is to be charged to the service provider 3000.

The communication unit 2900 communicates the variety of information to or from the service provider 3000 and the device 1000 in order for the server 2000 to sell a context item to the service provider 3000, to provide the object for providing the service provided by the service provider 3000 to the device 1000, and to calculate the fee that is to be charged to the service provider 3000.

The control unit 2950 controls the overall operation of the server 2000, and controls the context information receiving unit 2100, the context model providing unit 2200, the purchase request receiving unit 2300, the charging method determination unit 2400, the object generation unit 2500, the object providing unit 2600, the charging fee determination unit 2700, the DB 2800, and the communication unit 2900 so that the server 2000 sells a context item to the service provider 3000, provides the object for providing the service provided by the service provider 3000 to the device 1000, and calculates the fee that is to be charged to the service provider 3000.

Figure 18:
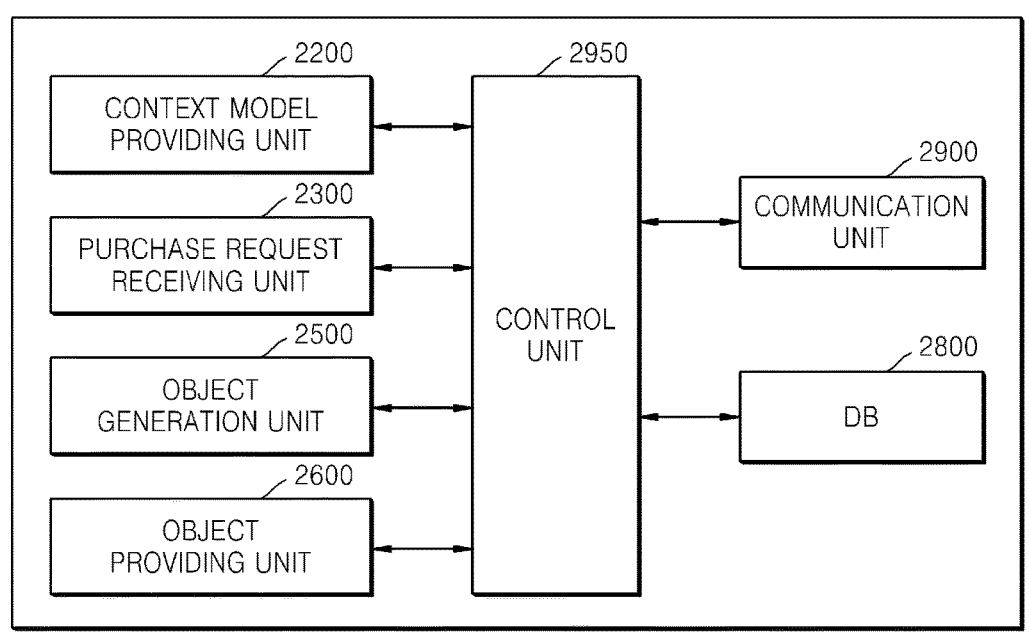
FIG. 18 is a block diagram of a server according to another exemplary embodiment.

FIG. 18 is a block diagram of a server 200 according to another exemplary embodiment.

Referring to FIG. 18, the server 2000 includes a context model providing unit 2200, a purchase request receiving unit 2300, an object generation unit 2500, an object providing unit 2600, a DB 2800, a communication unit 2900, and a control unit 2950.

The context model providing unit 2200 provides context models to the service provider 3000. The context model providing unit 2200 may provide at least one of context information and context models to the service provider 3000.

The purchase request receiving unit 2300 receives a purchase request for a context model selected by the service provider 3000, from the service provider 3000. The service provider 3000 may select a context model that is to be matched with a service provided by the service provider 3000 from among the context models received from the context model providing unit 2200, and may provide information about the selected context model to the purchase request receiving unit 2300. The service provider 3000 may select a context item from the context items included in the context models received from the context model providing unit 2200, and may provide information about the selected context item to the purchase request receiving unit 2300.

The purchase request receiving unit 2300 matches the service provided by the service provider 3000 with the selected context item. The purchase request receiving unit 2300 may receive a purchase request for the selected context item from the service provider 3000 and may match the service provided by the service provider 3000 with the context item purchased by the service provider 3000. The purchase request receiving unit 2300 may confirm that the service provider 3000 purchases the context item selected by the service provider 3000, and may match the context item purchased and selected by the service provider 3000 with the service provided by the service provider 3000. For example, the purchase request receiving unit 2300 may match the morning drama A, which is the service provided by the service provider 3000, with the context items 'weekday mornings,' 'housewife,' and 'TV.'

The object generation unit 2500 generates an object for accessing the service provided by the service provider 3000. The object generation unit 2500 may provide the service provider 3000 with a pre-set template used to generate an object, and may receive the template edited by the service provider 3000 from the service provider 3000. In this case, the object generation unit 2500 may provide an editing tool for editing a template to the service provider 3000, and the service provider 3000 may insert service information associated with a service provided by the service provider 3000 into the template using the editing tool. The service information is information associated with the service provided by the service provider 3000, and may include, for example, the title of the service, a link address for downloading content associated with the service, and an image associated with the service; however exemplary embodiments are not limited thereto.

The object generation unit 2500 may generate an object for accessing the service provided by the service provider 3000, using the edited template received from the service provider 3000. The object generation unit 2500 may also insert information about a reason why the object for accessing a service provided by the service provider 3000 is recommended to the device 1000, into the object. The object generation unit 2500 may generate the object by combining the template received from the service provider 3000 and a template received from at least one other service provider (not shown). However, when the service provider 3000 purchases a context item using an exclusive purchasing method, the object generation unit 2500 may insert the template of the service provider 300, and not that of the other service provider (not shown), into the object.

The object generation unit 2500 may match the generated object with the context model purchased by the service provider 3000. The object generation unit 2500 may match the generated object with the context item purchased by the service provider 3000.

The object providing unit 2600 provides the generated object to the device 1000. The object providing unit 2600 may select the context model according to a current situation of the device 1000 and may provide the device 1000 with the object for accessing a service provided by the service provider 3000 that requested to purchase the selected context model. The object providing unit 2600 may evaluate a current situation of the device 1000 and may provide the object to the device 1000 based on the current situation of the device 100 and the matched context item. The object providing unit 2600 may monitor, for example, a user of the device 1000, the type of the device 1000, the location of the device 1000, a current time, a day of the week, and an application that is being performed by the device 1000.

The object providing unit 2600 may compare the context item or context model purchased by the service provider 3000 with the current situation of the device 1000 and may provide the object to the device 1000 based on a result of the comparison. The object providing unit 2600 may select a context model based on a result of the monitoring of the current situation of the device 1000 and may provide the device 1000 with an object matched with the selected context model. When the context item purchased by the service provider 3000 is the same as or similar to the current situation of the first device 1000-1, the object providing unit 2600 may provide an object for accessing the service provided by the service provider 3000 to the first device 1000-1.

The communication unit 2900 communicates a variety of information to or from the service provider 3000 and the device 1000 in order for the server 2000 to sell a context item to the service provider 3000 and to provide the object for providing the service provided by the service provider 3000 to the device 1000.

The control unit 2950 controls the overall operation of the server 2000, and controls the context model providing unit 2200, the purchase request receiving unit 2300, the object generation unit 2500, the object providing unit 2600, the DB 2800, and the communication unit 2900 so that the server 2000 sells a context item to the service provider 3000 and to provide the object for providing the service provided by the service provider 3000 to the device 1000.

Figure 19:
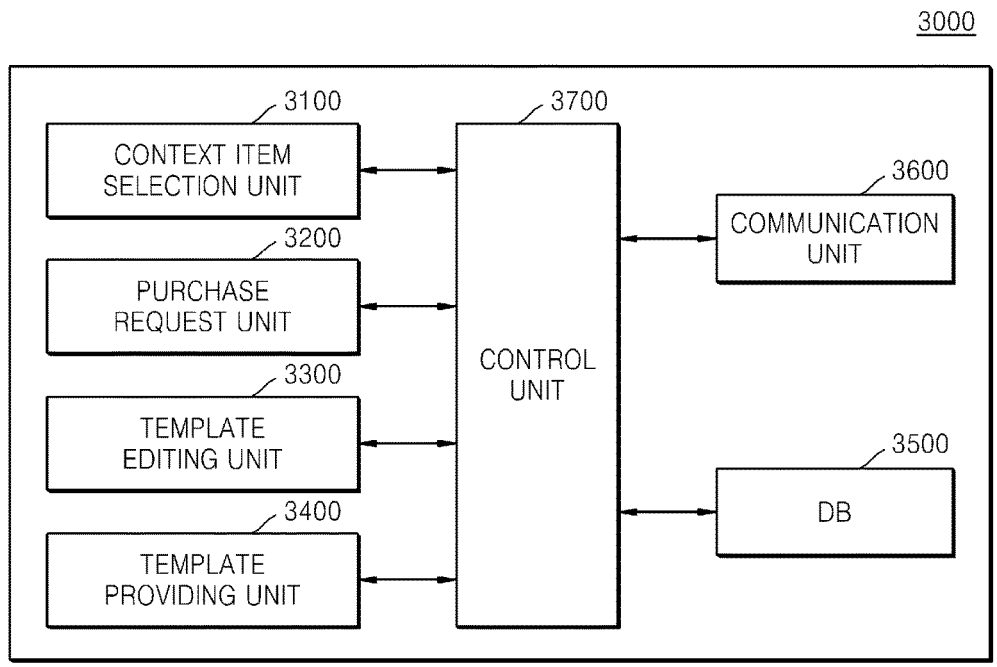
FIG. 19 is a block diagram of a service provider according to an exemplary embodiment.

FIG. 19 is a block diagram of a service provider 3000 according to an exemplary embodiment. The service provider 3000 may be a device or a server.

Referring to FIG. 19, the service provider 3000 includes a context item selection unit 3100, a purchase request unit 3200, a template editing unit 3300, a template providing unit 3400, a DB 3500, a communication unit 3600, and a control unit 3700.

The context item selection unit 3100 receives information about context models from the server 2000 and selects a context item based on the received information about the context models. The context item selection unit 3100 may select at least one of the services that are provided by the service provider 3000, and may select a context item for the selected service. The context item selection unit 3100 may select a context model or may select some of the context items included in the context models. For example, when a morning drama broadcasting service is matched with the context items 'weekday mornings,' 'housewife, and 'TV' in the context model, the context item selection unit 3100 may select a morning drama A of the service provider 3000 and may select the context items 'weekday mornings,' 'housewife,' and 'TV' for the morning drama A.

The purchase request unit 3200 may transmit a purchase request for the context item selected for the selected service to the server 2000. The purchase request unit 3200 may provide an ID of the selected service and the selected context item to the server 2000. For example, when the context item selection unit 3100 selects the morning drama A and selects the context items 'weekday mornings,' 'housewife, and 'TV' for the selected morning drama A, the purchase request unit 3200 may provide the context items 'morning drama A,' 'morning in weekdays,' 'housewife,' and 'TV' to the server 2000. The purchase request unit 3200 may transmit a purchase request for the context items 'morning drama A,' 'morning in weekdays,' 'housewife,' and 'TV' to the server 2000.

The purchase request unit 3200 provides information about a charging method and a purchase fee for the selected context item to the server 2000. The purchase request unit 3200 may provide information about how and how much the selected context item is charged, to the server 2000. Based on the context item purchased by the purchase request unit 3200, the service provided by the service provider 3000 is provided to the device 1000, and thus the server 2000 may charge the service provider 3000 a predetermined fee. In this case, the server 2000 may determine a fee that is to be charged to the service provider 3000, based on the charging method and fee provided by the purchase request unit 3200. The charging method may include, for example, an auction method, a group purchasing method, an exclusive purchasing method, a charging method according to the exposure degree of an object, and a charging method according to service utilization via the object; however, exemplary embodiments are not limited thereto.

The template editing unit 3300 receives a template for object generation from the server 2000 and edits the received template. The template for object generation may include a plurality of regions, for example, a region for inserting a description of a service, a region for inserting an image of the service, and a region for inserting a menu and icons for using the service; however, exemplary embodiments are not limited thereto.

The template editing unit 3300 may receive an editing tool for editing a template from the server 2000 and may edit the template using the editing tool. The template editing unit 3300 may insert the service information into each region included in the template using the editing tool received from the server 2000. The service information is information associated with the service provided by the service provider 3000, and may include, for example, the title of the service, a link address for downloading content associated with the service, and an image associated with the service; however exemplary embodiments are not limited thereto.

The template providing unit 3400 provides the edited template to the server 2000. The template providing unit 3400 may provide a template into which the service information of the service provider 3000 has been inserted, to the server 2000.

The DB 3500 stores a variety of information that is required by the service provider 3000 for purchasing a context item and editing the template for object generation.

The communication unit 3600 communicates the variety of information to or from the server 2000 and the device 1000 so that the service provider 3000 may purchase a context item and edit the template for object generation.

The control unit 3700 controls the overall operation of the service provider 3000, and controls the context item selection unit 3100, the purchase request unit 3200, the template editing unit 3300, the template providing unit 3400, the DB 3500, and the communication unit 3600 so that the service provider 3000 may purchase a context item and edit the template for object generation.

Figure 20:
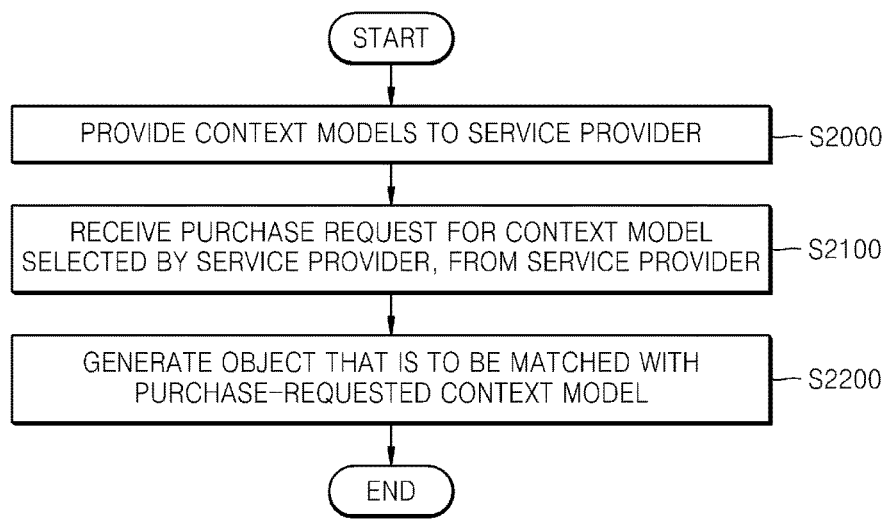
FIG. 20 is a flowchart illustrating a method in which a server generates an object matched with a context model.

FIG. 20 is a flowchart illustrating a method in which the server 2000 generates an object matched with a context model.

In operation S2000, the server 2000 provides context models to the service provider 3000. The server 2000 may provide at least one of context information and context models to the service provider 3000.

In operation S2100, the server 2000 receives a purchase request for a context model selected by the service provider 3000, from the service provider 3000. The service provider 3000 may select a context model that is to be matched with a service provided by the service provider 3000 from among the context models received from the server 2000, and may provide information about the selected context model to the server 2000. The service provider 3000 may select a context item from among the context items included in the context models received from the server 2000, and may provide information about the selected context item to the server 2000.

In operation S2200, the server 2000 generates an object that is to be matched with the purchase-requested context model. The server 2000 may provide the service provider 3000 with a pre-set template used to generate an object, and may receive the template edited by the service provider 3000 from the service provider 3000. In this case, the server 2000 may provide an editing tool for editing a template to the service provider 3000, and the service provider 3000 may insert service information associated with a service provided by the service provider 3000 into the template using the editing tool.

The server 2000 may generate an object for accessing the service provided by the service provider 3000, using the edited template received from the service provider 3000. The server 2000 may also insert information about a reason why the object for accessing a service provided by the service provider 3000 is recommended to the device 1000, into the object.

The server 2000 may match the generated object with the context model purchased by the service provider 3000. The server 2000 may match the generated object with the context item purchased by the service provider 3000.

The term "unit" as used herein means a hardware component, such as a processor or circuit, and/or a software component that is executed by a hardware component such as a processor.

Exemplary embodiments may be embodied in a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

Although exemplary embodiments have been disclosed for illustrative purposes, one of ordinary skill in the art will appreciate that diverse variations and modifications are possible, without departing from the spirit and scope of the inventive concept. Thus, the above embodiments should be understood not to be restrictive but to be illustrative, in all aspects. For example, respective elements described in an integrated form may be dividedly used, and the divided elements may be used in a state of being combined.

The exemplary embodiments should be considered in descriptive sense only and not for purposes of limitation. Descriptions of features or aspects within each embodiment should typically be considered as available for other similar features or aspects in other embodiments.

While exemplary embodiments have been particularly shown and described, it will be understood by those of ordinary skill in the art that various changes in form and details may be made therein without departing from the spirit and scope of the inventive concept as defined by the following claims.

What is claimed is:

1. A server for providing a user interface for accessing an online service of an online service provider, the server comprising:
    a storage configured for storing a plurality of context models associated with the online service, the plurality of context models comprising unique combinations of a group of context items, each of the unique combinations of the group of context items representing a situation in which the online service is provided, and the group of context items comprising at least a service type;
    a communication interface configured for transmitting to the online service provider the plurality of context models; and
    a processor configured to:
        receive, by controlling the communication interface and from the online service provider, a request to match the online service provided by the online service provider with a context model which is selected, by the online service provider, from among the plurality of context models,
        identify a device that corresponds to at least one context item in the selected context model,
        based on the selected context model, generate the user interface for accessing the online service of the online service provider, and
        transmit the user interface to the device,
    wherein the generated user interface displays (i) information associated with the selected context model associated with the request received from the online service provider, and (ii) at least one piece of link information for receiving the online service from the online service provider;
    wherein the situation describes at least one of a user of the device, a type of the device, a location of the device, a current time of the device, and an application being executed by the device, and
    wherein the processor is further configured to provide a template for use in generation of the user interface to the online service provider, receive an edited template from the online service provider, and generate the user interface using the edited template.

2. The server of claim 1, wherein the online service provider purchases the selected context model to match the generated user interface with the selected context model.

3. The server of claim 1, wherein the processor is further configured to monitor a current situation of the device and select the context model based on a result of the monitoring.

4. The server of claim 1, wherein the processor is further configured to generate and provide the plurality of context models to the online service provider.

5. The server of claim 1, wherein the request is submitted by the online service provider for the at least one context item selected from among the group of context items.

6. The server of claim 5, wherein the group of context items is suggested to the online service provider according to a plurality of service types.

7. The server of claim 5, wherein the processor is further configured to match the at least one context item associated with the request with the online service of the online service provider.

8. The server of claim 1, wherein the processor is further configured to determine a charging fee which the online service provider pays when the user interface is provided to the device.

9. The server of claim 8, wherein the processor is further configured to receive information about a charging method selected by the online service provider and determine the charging method for the online service provider based on the received information about the charging method, and
    calculate the charging fee based on the determined charging method.

10. The server of claim 9, wherein the charging method comprises a group purchasing method, and
    wherein the processor is further configured to:
        determine an exposure probability of an object for accessing the online service of the online service provider, based on a purchase fee paid by the online service provider, and
        provide the user interface to the device based on the exposure probability.

11. The server of claim 9, wherein the charging method comprises an auction method, and
    the processor is further configured to provide to the device the user interface for accessing the online service of the online service provider, when a bid amount of the online service provider is higher than a bid amount of another online service provider.

12. The server of claim 9, wherein
    the charging method is a method of charging the online service provider according to a degree of exposure of an object, and
    the processor is further configured to calculate the charging fee based on at least one of a number of times the object is provided and a number of times the object is executed by the device.

13. The server of claim 9, wherein the charging method is a method of charging the online service provider according to use of the online service via an object, and
    wherein the processor is further configured to calculate the charging fee based on at least one of a purchase fee of content purchased by the device via the online service that is used via the user interface and a utilization fee of the online service used via the object.

14. The server of claim 1, wherein the processor is further configured to provide an editing tool for editing the template.

15. The server of claim 14, wherein the processor is further configured to insert a reason why the user interface is recommended, into the edited template.

16. The server of claim 14, wherein the edited template is obtained by the online service provider using the editing tool which the online service provider receives from the server.

17. The server of claim 1, wherein the user interface comprises icons, texts, images, and link information of content provided via the online service, and a description about functions of the user interface.

18. A method in which a server provides a user interface for accessing an online service of an online service provider, the method comprising:
storing a plurality of context models associated with the online service, the plurality of context models comprising unique combinations of a group of context items, each of the unique combinations of the group of context items representing a situation in which the online service is provided, and the group of context items comprising at least a service type;
transmitting to the online service provider the plurality of context models and a template for use in generation of the user interface;
receiving, from the online service provider, a request to match the online service provided by the online service provider with a context model which is selected, by the online service provider, from among the plurality of context models;
receiving an edited template from the online service provider;
identifying a device that corresponds to at least one context item in the selected context model;
based on the edited template and the selected context model, generating the user interface for accessing the online service of the online service provider, in response to receiving the request; and
transmitting the generated user interface to the device,
wherein the generated user interface displays (i) information associated with the selected context model associated with the request received from the online service provider, and (ii) at least one piece of link information for receiving the online service from the online service provider, and
wherein the situation describes at least one of a user of the device, a type of the device, a location of the device, a current time of the device, and an application being executed by the device.

19. The method of claim 18, wherein the online service provider purchases the selected context model to match the generated user interface with the selected context model.

20. The method of claim 19, further comprising monitoring a current situation of the device and selecting the context model based on a result of the monitoring.

21. A method comprising:
receiving from a server a plurality of context models associated with an online service, the plurality of context models comprising unique combinations of a group of context items, each of the unique combinations of the group of context items representing a situation in which the online service is provided, and the group of context items comprising at least a service type;
receiving a template for use in generation of a user interface;
selecting a context model from among the plurality of context models;
generating an edited template based on the received template and the selected context model;
transmitting, to the server, a request to match the online service with the selected context model; and
transmitting the edited template to the server,
wherein the user interface for accessing the online service of an online service provider is generated by the server based on the edited template and the selected context model in response to the request, and
wherein the user interface displays (i) information associated with the selected context model associated with the request transmitted by the online service provider, and (ii) at least one piece of link information for receiving the online service from the online service provider
wherein the user interface is provided to a device that corresponds to at least one context item in the selected context model, and
wherein the situation describes at least one of a user of the device, a type of the device, a location of the device, a current time of the device, and an application being executed by the device.

22. The method of claim 21, wherein each of the plurality of context models comprises a unique combination of a first context item, a second context item, a third context item, and a fourth context item.

23. The method of claim 21, wherein the selecting the context model comprises selecting at least one context item from among the group of context items included in the plurality of context models.

24. A non-transitory computer-readable medium storing a program causing a computer to execute a method in which a server provides a user interface for accessing an online service of an online service provider, the method comprising:
storing a plurality of context models associated with the online service, the plurality of context models comprising unique combinations of a group of context items, each of the unique combinations of the group of context items representing a situation in which the online service is provided, and the group of context items comprising at least a service type;
transmitting to the online service provider the plurality of context models and a template for use in generation of the user interface;
receiving, and from the online service provider, a request to match the online service provided by the online service provider with a context model which is selected, by the online service provider, from among the plurality of context models;
receiving an edited template from the online service provider;
identifying a device that corresponds to at least one context item in the selected context model;
based on the edited template and the selected context model, generating the user interface for accessing the online service of the online service provider, in response to receiving the request; and
transmitting the user interface to the device,
wherein the generated user interface displays (i) information associated with the selected context model associated with the request received from the online service provider, and (ii) at least one piece of link information for receiving the online service from the online service provider, and wherein the situation describes at least one of a user of the device, a type of the device, a location of the device, a current time of the device, and an application being executed by the device.

25. A non-transitory computer-readable medium storing a program causing a computer to execute a method comprising:

receiving from a server a plurality of context models associated with an online service, the plurality of context models comprising unique combinations of a group of context items, each of the unique combinations of the group of context items representing a situation in which the online service is provided, and the group of context items comprising at least a service type;

receiving a template for use in generation of a user interface;

selecting a context model from among the plurality of context models;

generating an edited template based on the received template and the selected context model;

transmitting, to the server, a request to match the online service with the selected context model; and transmitting the edited template to the server, wherein the user interface for accessing the online service of an online service provider is generated by the server based on the edited template and the selected context model in response to the request wherein the user interface displays (i) information associated with the selected context model associated with the request transmitted by the online service provider, and (ii) at least one piece of link information for receiving the online service from the online service provider wherein the user interface is provided to a device that corresponds to at least one context item in the selected context model, and wherein the situation describes at least one of a user of the device, a type of the device, a location of the device, a current time of the device, and an application being executed by the device.

* * * * *